US012750326B2

(12) United States Patent
Guo

(10) Patent No.: US 12,750,326 B2
(45) Date of Patent: Sep. 29, 2026

(54) RESOURCE RESERVATION METHOD AND ELECTRONIC DEVICE

(71) Applicant: NEW H3C TECHNOLOGIES CO., LTD., Zhejiang (CN)

(72) Inventor: Daorong Guo, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 18/714,702

(22) PCT Filed: Dec. 8, 2022

(86) PCT No.: PCT/CN2022/137655
§ 371 (c)(1),
(2) Date: May 30, 2024

(87) PCT Pub. No.: WO2024/119450
PCT Pub. Date: Jun. 13, 2024

(65) Prior Publication Data
US 2025/0175438 A1 May 29, 2025

(51) Int. Cl.
*H04L 47/78* (2022.01)
*H04L 47/70* (2022.01)

(52) U.S. Cl.
CPC .......... *H04L 47/781* (2013.01); *H04L 47/822* (2013.01)

(58) Field of Classification Search
CPC . H04L 47/781; H04L 47/822; H04L 47/2416; H04L 47/72; H04L 12/12
See application file for complete search history.

(56) References Cited

U.S. PATENT DOCUMENTS 10,979,350 B1 * 4/2021 Nainar .................. H04L 45/507
2016/0277247 A1 * 9/2016 Kim .................... H04L 41/0826
(Continued)

FOREIGN PATENT DOCUMENTS

CN 107204941 A 9/2017
CN 109586973 A 4/2019
(Continued)

OTHER PUBLICATIONS

ISA State Intellectual Property Office of the People's Republic of China, International Search Report Issued in Application No. PCT/CN2022/137655, Mar. 14, 2023, WIPO, 3 pages.
(Continued)

*Primary Examiner* — Farzana B Huq
(74) *Attorney, Agent, or Firm* — Greenblum & Bernstein, P.L.C.

(57) ABSTRACT

A method applied to a management/control plane entity (MCPE), comprises: determining a virtual periodic forwarding path (VPFP) of a DetNet flow; for the target egress interface on each node in the VPFP, planning a target scheduling cycle for scheduling and transmitting the DetNet flow; wherein the target scheduling cycle of the target egress interface on any node other than the head node in the VPFP is determined based on the scheduling cycle mapping relationship between a previous hop node of the any node and the any node and the target scheduling cycle of the target egress interface on the previous hop node; from an available transmission resource corresponding to the target scheduling cycle of the target egress interface on each node in the VPFP, reserving a target transmission resource for transmitting the DetNet flow within the target scheduling cycle.

20 Claims, 9 Drawing Sheets

(56) References Cited

U.S. PATENT DOCUMENTS

| | | | | |
|---|---|---|---|---|
| 2017/0273002 | A1 | 9/2017 | Chen et al. | |
| 2019/0280983 | A1* | 9/2019 | Thubert | H04L 47/283 |
| 2022/0014485 | A1* | 1/2022 | Pocovi | H04L 1/1838 |
| 2022/0166720 | A1* | 5/2022 | Jabbar | H04L 47/28 |
| 2023/0156523 | A1* | 5/2023 | Xiong | H04W 28/10 370/329 |
| 2023/0209371 | A1* | 6/2023 | Kang | H04W 24/02 709/220 |

FOREIGN PATENT DOCUMENTS

| | | | |
|---|---|---|---|
| CN | 111385151 | A | 7/2020 |
| WO | 2022183879 | A1 | 9/2022 |

OTHER PUBLICATIONS

M. Chen et al. "Segment Routing (SR) Based Bounded Latency",China Mobile, May 7, 2019, 24 pages.
Zongpeng Du et al. "Micro-burst Decreasing in Layer3 Network for Low-Latency Traffic", Oct. 2021, 9 pages.
European Patent Office, Extended European Search Report Issued in Application No. 22966009.7, Nov. 25, 2024, Germany, 11 pages.
M.Chen et al: "Segment Routing (SR) Based Bounded Latency draft-chen-detnet-sr-based-bounded-latency-01", XP015132842, May 7, 2019, 13 pages.
ISA State Intellectual Property Office of the People's Republic of China, Written Opinion of the International Searching Authority Issued in Application No. PCT/CN2022/137655, Mar. 14, 2023, WIPO, 6 pages.

* cited by examiner

RESOURCE RESERVATION METHOD AND ELECTRONIC DEVICE

CROSS REFERENCE TO RELATED APPLICATIONS

This application is a National Stage of International Application No. PCT/CN2022/137655, filed on Dec. 8, 2022, the disclosure of which is incorporated herein by reference in its entirety for all purposes.

TECHNICAL FIELD

The present disclosure relates to the field of network communication technologies, and in particular to a resource reservation method and an electronic device.

BACKGROUND

Within a DetNet domain, for example, data packets of flow1, flow 2 and flow 3, which are three DetNet flows in total, are forwarded from different edge devices to a same convergence device, and these data packets need to be sent out in a same scheduling cycle of a same egress interface of the convergence device.

SUMMARY

Embodiments of the present disclosure provide a resource reservation method and apparatus and an electronic device, so as to solve a scheduling conflict among DetNet flows within a DetNet domain.

An embodiment of the present disclosure provides the following technical solution.

A resource reservation method is provided, which is applied to a management/control plane entity (MCPE). The method includes:

- determining a virtual periodic forwarding path (VPFP) of a DetNet flow; wherein there is a scheduling cycle mapping relationship between any node other than a tail node in the VPFP and a next hop node of the any node; the scheduling cycle mapping relationship refers to a mapping relationship between a scheduling cycle of a target egress interface for transmitting the DetNet flow on any node other than the tail node in the VPFP and a scheduling cycle of a target egress interface for transmitting the DetNet flow on the next hop node of the any node;
- for the target egress interface on each node in the VPFP, planning a target scheduling cycle for scheduling and transmitting the DetNet flow; wherein the target scheduling cycle of the target egress interface on any node other than the head node in the VPFP is determined based on the scheduling cycle mapping relationship between a previous hop node of the any node and the any node, and the target scheduling cycle of the target egress interface on the previous hop node;
- from an available transmission resource corresponding to the target scheduling cycle of the target egress interface on each node in the VPFP, reserving a target transmission resource for transmitting the DetNet flow within the target scheduling cycle so as to transmit the DetNet flow by the target transmission resource allocated for the target scheduling cycle of the target egress interface on each node in the VPFP.

An embodiment of the present disclosure provides a resource distribution method, which is applied to a network node. The method includes:

- receiving forwarding information of a DetNet flow to be transmitted which is distributed from a management/control plane entity (MCPE); wherein the forwarding information at least includes: configuration information of a virtual periodic forwarding path (VPFP) and configuration information of a virtual periodic forwarding channel (VPFC); the configuration information of the VPFP at least includes a VPFP identifier; the VPFP identifier is used to represent the VPFP of the DetNet flow, and there is a scheduling cycle mapping relationship between any node other than a tail node in the VPFP and a next hop node of the any node; the scheduling cycle mapping relationship refers to a mapping relationship between a scheduling cycle configured for a target egress interface for transmitting the DetNet flow on the any node other than the tail node in the VPFP and a scheduling cycle configured for a target egress interface for transmitting the DetNet flow on the next hop node; the configuration information of the VPFC at least includes: a target scheduling cycle for scheduling and transmitting the DetNet flow of the target egress interface on the head node of the VPFP, and a target transmission resource allocated for the target scheduling cycle to transmit the DetNet flow;
- when the DetNet flow is received, based on the forwarding information, scheduling and transmitting the DetNet flow in the target scheduling cycle for scheduling and transmitting the DetNet flow of the target egress interface on the current node.

An embodiment of the present disclosure provides a network device, which includes a processor and a machine readable storage medium;

- the machine readable storage medium stores machine executable instructions executed by the processor;
- the processor is configured to execute the machine executable instructions to perform any one of the above methods.

An embodiment of the present disclosure provides a machine readable storage medium storing machine executable instructions executable by a processor, wherein,

- the machine executable instructions are executed by the processor to perform any one of the above methods.

BRIEF DESCRIPTION OF THE DRAWINGS

The accompanying drawings herein, which are incorporated in and constitute a part of the specification, illustrate the embodiments of the present disclosure and serve to explain the principle of the present disclosure together with the specification.

DETAILED DESCRIPTION OF THE EMBODIMENTS

Figure 1:
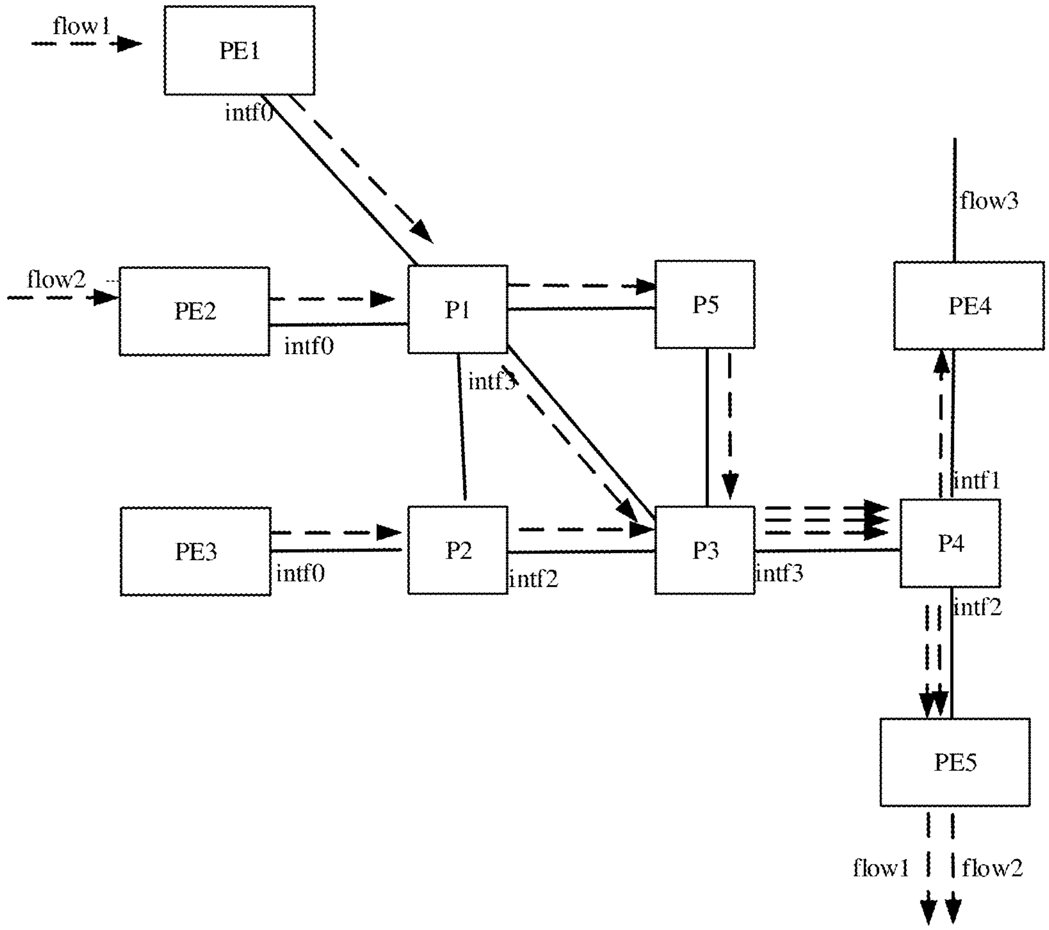
FIG. 1 is a structural diagram illustrating a network according to an embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure.

The terms used in the present disclosure are used only to describe particular embodiments rather than limit the present disclosure. Terms "a", "the" and "said" in singular form used in the present disclosure also intend to include plurality, unless otherwise clearly indicated in the context.

Within a DetNet domain, if there are no resource reservations, scheduling conflicts of DetNet flows will occur frequently. For example, data packets of flow1, flow 2 and flow 3, which are three DetNet flows in total, are forwarded from different edge devices to a same convergence device, and these data packets need to be sent out in a same scheduling cycle of a same egress interface of the convergence device. But, forwarding the data packets of flow 1, flow 2 and flow 3 within the above scheduling cycle may exceed a forwarding capability during the scheduling cycle, bringing scheduling conflicts to scheduling and forwarding of flow 1, flow 2 and flow 3 in the above scheduling cycle, and affecting the transmission determinism of DetNet flows. In a network shown in FIG. 1, three DetNet flows flow1, flow2 and flow3 are converged to P3 through edge devices PE1, PE2 and PE3, respectively. Herein, P3 is a router device of a service provider (P), which is also referred to as convergence device. Herein, flow1, flow2 and flow3 may also be DetNet flows generated by aggregating multiple service flows, which is not limited in this embodiment.

For example, in a scenario (a case that is unavoidable in practical applications), three DetNet flows flow1, flow2 and flow3 reach P3 and are to be scheduled and forwarded to P4 in a same scheduling cycle (denoted as scheduling cycle d) of intf3 on P3. In this case, it is possible that a scheduling conflict among flow1, flow2 and flow3 occurs in the scheduling cycle d. For example, a bandwidth of a physical link is 100G bps and a time length of the scheduling cycle is planned as 10 us, thus about 125000 bytes of data can be transmitted in any scheduling cycle. If each of the DetNet flows flow1, flow2 and flow3 has 125000 bytes of data reaching P3 within 10 us, and no data reaching within 990 us thereafter, the rate of each DetNet flow, seen from the time interval of 10 us, reaches 100G bps, and the rate of the each DetNet flow, seen from the time interval of 1 ms, reaches only 1G bps. In this case, if flow1, flow2 and flow3 are all scheduled and transmitted in the scheduling cycle d of an interface 3 (intf3) on P3, it is likely that the reaching service data (the service data of the DetNet flows flow 1, flow 2 and flow 3) cannot be sent in the scheduling cycle d, that is, a scheduling conflict among three DetNet flows flow 1, flow 2 and flow 3 occurs in the scheduling cycle d. Further, the scheduling conflict may generate additional random queuing latency and in worse case, because peer-to-peer jitter or jitter after multiple hops may exceed an upper jitter limit that the DetNet flows can tolerate, Cycle Specified Queuing and Forwarding (CSQF) cannot be achieved, thus affecting scheduling and transmission of the DetNet flows.

In order to solve the above technical problems, an embodiment of the present disclosure provides a resource reservation method. In the resource reservation method, path planning may be first performed for a DetNet flow, and based on the planned path, resource reservation is performed, so as to ensure no scheduling conflict of the DetNet flow occurs in a DetNet domain, for example, in a CSQF domain. Thus, within any scheduling cycle of the DetNet domain, data of the planned DetNet flow will not exceed the forwarding capability of the scheduling cycle.

Before the resource reservation method provided by the embodiments of the present disclosure is described, a resource reservation mathematical model provided by the embodiments of the present disclosure is described.

In an embodiment, a scheduling cycle mapping relationship corresponding to a DetNet flow may be established. The scheduling cycle mapping relationship herein refers to a mapping relationship between a scheduling cycle of an egress interface (denoted as a target egress interface) for transmitting the DetNet flow on a first node and a scheduling cycle of an egress interface (denoted as a target egress interface) for transmitting the DetNet flow on a second node. Herein, the first node refers to any node other than a tail node in the planned forwarding path for forwarding the DetNet flow in a network domain, and the second node refers to a next hop node of the first node in the above forwarding path via which the DetNet flow is transmitted in the DetNet domain.

Figure 2:
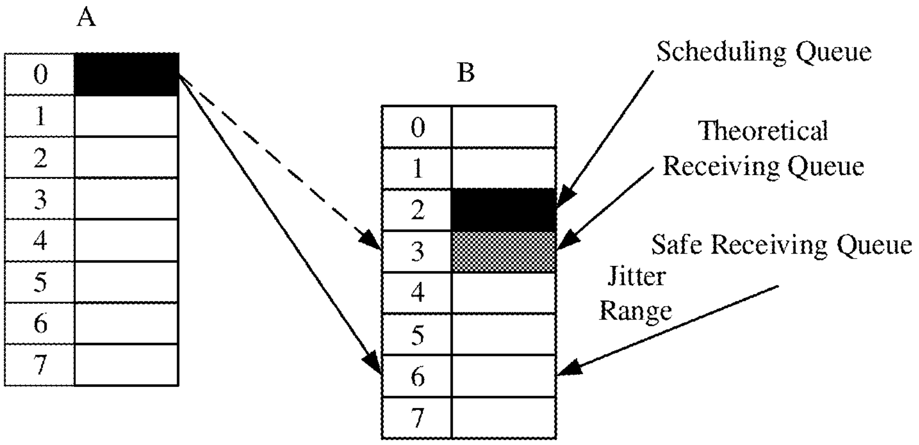
FIG. 2 is a schematic diagram illustrating a scheduling cycle mapping relationship according to an embodiment of the present disclosure.

As an embodiment, the above scheduling cycle mapping relationship may be completed by measurement and calibration. FIG. 2 illustrates, by way of example, a scheduling cycle mapping relationship. As shown in FIG. 2, a first scheduling cycle of a target egress interface on a node A is mapped to a seventh scheduling cycle of a target egress interface on a node B, and specifically, when a DetNet-flow packet sent in the first scheduling cycle of the target egress interface on the node A reaches the node B, the packet may be scheduled and forwarded in the seventh scheduling cycle of the target egress interface on the node B; similar operations are performed in sequence for other scheduling cycles of the target egress interface on the node A. For the scheduling cycle mapping relationship, there is a same cycle number offset between each scheduling cycle of the target egress interface on the node A and the mapped scheduling cycle of the target egress interface on the node B.

In this embodiment, the above scheduling cycle mapping relationship may be represented by a mapping function. With FIG. 2 as an example, the scheduling cycle mapping relationship may be regarded as the following mapping function: defining domain x as a range of the scheduling cycle of the target egress interface on the node A (e.g. schedule cycle 0 to schedule cycle 7), to obtain a value domain by this mapping function, the value domain being a range of the scheduling cycle of the target egress interface on the node B. The range of the scheduling cycle of the target egress interface on the node B is, for example, scheduling cycle 0 to scheduling cycle 7.

In this embodiment, the above scheduling cycle mapping relationship may have the following constraint: one scheduling cycle of the target egress interface on the first node is mapped to one unique scheduling cycle of the target egress interface on the second node. Still taking the node A and the node B as an example, based on the above constraint, one scheduling cycle of the target egress interface on the node A is mapped to one unique scheduling cycle of the target egress interface on the node B, disallowing multiple scheduling cycles of the target egress interface on the node A to be simultaneously mapped to one scheduling cycle of the target egress interface on the node B.

Based on the above constraint, the above scheduling cycle mapping relationship means an injective function.

Still, in the network shown in FIG. 1, taking the DetNet flow forwarding path of flow1 as an example: such as PE1->P1->P3. It is assumed that the scheduling cycle mapping relationship between the interface 0 (denoted as intf0, which is a target egress interface for transmitting flow1) on PE1 and the interface 3 (denoted as intf3, which is a target egress interface for transmitting flow1) on P1 is represented by an injective function f1(x) (abbreviated as f1), the scheduling cycle mapping relationship between the intf3 on P1 and the intf3 (a target egress interface for transmitting flow1) on P3 is represented by an injective function f2(x) (abbreviated as f2), and the scheduling cycle mapping relationship between the intf0 on PE1 and the intf3 (a target egress interface for transmitting flow1) on P3 is denoted as a composite function f13 (x) (abbreviated as f13). Thus, the f13 (x) can be represented as follows: $f13(x)=f2(f1(x))=(f2^\circ f1)(x)$, where "°" represents a composition of two functions. Because f1 and f2 are both injective functions, it can be derived based on the above formula that f13 also is an injective function.

Similarly, the DetNet flow forwarding path PE2->P1->P3 of the flow2 is taken as an example. The scheduling cycle mapping relationship between the intf0 (a target egress interface for transmitting flow2) on PE2 and the intf3 (a target egress interface for transmitting flow2) on P3 is denoted as a composite function g23(x) (abbreviated as g23). $g23(x)=(f2^\circ g1)(x)$, where "°" is an injective function g1 (x) which represents the scheduling cycle mapping relationship between the intf0 (a target egress interface for transmitting flow2) on PE2 and the intf3 (a target egress interface for transmitting flow2) on P1, and f2 is an injective function f2(x) which represents the scheduling cycle mapping relationship between the intf3 (a target egress interface for transmitting flow2) on P1 and the intf3 (a target egress interface for transmitting flow2) on P3. Since g1 and f2 are injective functions, the above composite function g23 fused with g1 and f2 is also an injective function. Further, the DetNet flow forwarding path PE3->P2->P3 of the flow3 is taken as an example. The scheduling cycle mapping relationship between the intf0 (a target egress interface for transmitting flow3) on PE3 and the intf3 (a target egress interface for transmitting flow3) on P3 is denoted as a composite function h33(x). $h33(x)=h2^\circ h1(x)$, where h1 represents an injective function h1(x), which represents the scheduling cycle mapping relationship between the intf0 (a target egress interface for transmitting flow3) on PE3 and the intf2 (a target egress interface for transmitting flow3) on P2, and h2 represents an injective function h2(x), which represents the scheduling cycle mapping relationship between the intf2 (a target egress interface for transmitting flow3) on P2 and the intf3 (a target egress interface for transmitting flow3) on P3. Since h1 and h2 are injective functions, the above composite function h33 fused with h1 and h2 is also an injective function.

If the above three DetNet flows flow1, flow2 and flow3 are converged to P3 via PE1, PE2 and PE3 respectively and forwarded out in a same scheduling cycle of the egress interface intf3 on P3, the following case may be obtained: f13(a1), g23(b1) and h33(c1) are the same; where a1 is the scheduling cycle in which PE1 schedules and transmits flow1 via the intf0, b1 is the scheduling cycle in which PE2 schedules and transmits flow2 via the intf0, and c1 is the scheduling cycle in which PE3 schedules and transmits flow3 via the intf0.

If the above f13 (a1), g23(b1) and h33 (c1) are the same and all use the scheduling cycle d of the egress interface intf3 on P3, it means that the scheduling cycle a1 of the intf0 on PE1 is mapped to the scheduling cycle d of the intf3 on P3, the scheduling cycle b1 of the intf0 on PE2 is mapped to the scheduling cycle d of the intf3 on P3, and the scheduling cycle c1 of the intf0 on PE3 is mapped to the scheduling cycle d of the intf3 on P3. In this case, if it is desired to avoid scheduling conflicts when scheduling and forwarding flow1, flow2 and flow3 in the above scheduling cycle d, scheduling planning may be performed for any one of flow1, flow2 and flow3 based on the injectivity of the injective function to change the scheduling cycle in which the flow is scheduled and forwarded in the head node. The head node herein refers to a first node on the planned forwarding path of the flow. By taking flow1 as an example, if it is found that when scheduling flow1 in the scheduling cycle a1 of the egress interface intf0 on the PE1 (the head node on the planned forwarding path of the flow), scheduling conflicts will occur between flow1 and flow 2 planned to be scheduled and transmitted in the scheduling cycle d of the egress interface intf3 on P3, the scheduling cycle for flow 1 of the egress interface intf0 on PE1 may be changed. For example, the scheduling cycle for flow 1 is modified from the scheduling cycle a1 to another scheduling cycle different from a1, for example, the scheduling cycle c1. Based on the injectivity of the injective function, f13(c1) is different from f13 (a1), namely, $f13(c1)\neq f13(a1)$ and further, f13 (c1) is different from g23 (b1), namely, $f13(c1)\neq g23(b1)$. Even if it is planned that flow2 is scheduled in the scheduling cycle b1 of the egress interface intf0 on PE2, no scheduling conflict occurs to flow1 and flow2 in the scheduling cycle d of the egress interface intf3 on P3. The planning of the scheduling and transmission of flow3 is similar and will not be repeated herein.

Based on the above descriptions, it can be known that, in this embodiment, under the precondition of ensuring the mapping relationship of the scheduling cycles of the target egress interfaces on different nodes is an injective function, if scheduling conflict occurs between a DetNet flow and another DetNet flow at the egress interface of the convergence point, or scheduling conflict occurs at a small-bandwidth egress interface of a non-convergence point, the scheduling cycle in which the DetNet flow is scheduled and forwarded in the head node (the first node in the planned forwarding path) may be changed so as to eliminate the above conflict. Based on this principle, when resource reservation is performed for the DetNet flow in this embodiment, a head node in the forwarding path for forwarding the DetNet flow is first determined, and then, by starting from a scheduling cycle of the target egress interface for transmitting the DetNet flow on the head node, based on data transmission requirements of the DetNet flow, the target scheduling cycle (the available transmission resource of the target scheduling cycle satisfies the above data transmission requirement) of the target egress interface for transmitting the DetNet flow on each node is determined sequentially. Herein, the target scheduling cycle of the target egress interface on any node other than the head node is determined based on a mapping relationship between a scheduling cycle of a target egress interface on the current node and a scheduling cycle of a target egress interface on a previous hop node and a target scheduling cycle of the target egress interface on the previous hop node. Descriptions are made below with an example based on the flow shown in FIG. 3.

Figure 3:
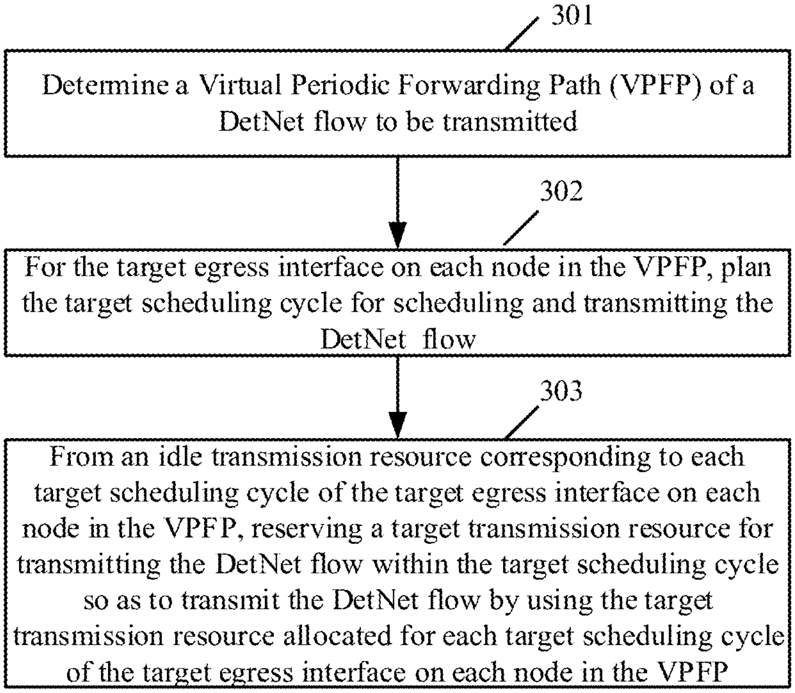
FIG. 3 is a flowchart illustrating a method according to an embodiment of the present disclosure.

Referring to FIG. 3, FIG. 3 is a flowchart illustrating a method according to an embodiment of the present disclosure. As an embodiment, the flow may be applied to a Management/Control Plane Entity (MCPE). The MCPE is an abstract network element for describing flow and service information model and is mainly in charge of network management and control, for example, collecting topology information of network nodes and a capability of a deterministic network (DetNet) based on a network configuration protocol (NETCONF)/data modeling language (YANG) and the like, and based on a flow establishment request, calculating one or more through-network effective paths and selecting an optimal path and configuring nodes on the path to performing flow transmission in the DetNet. Herein, the above data modeling language is used to perform modeling on configuration and state data of NETCONF, NETCONF remote process invoke and NETCONF notification operation.

As shown in FIG. 3, the flow may include the following blocks.

At block 301, a Virtual Periodic Forwarding Path (VPFP) of a DetNet flow to be transmitted is determined.

The VPFP in this embodiment is different from a conventional forwarding path for forwarding a DetNet flow. Compared with the conventional forwarding path for forwarding the DetNet flow, on the basis of the conventional forwarding path, the VPFP in this embodiment further includes a scheduling cycle mapping relationship between any node other than a tail node in the forwarding path and a next hop node. Herein, the scheduling cycle mapping relationship as described above specifically refers to a mapping relationship between a scheduling cycle configured for the target egress interface for transmitting the DetNet flow on any node other than the tail node in the VPFP and a scheduling cycle configured for the target egress interface for transmitting the DetNet flow on the next hop node.

As an embodiment, the head node in the VPFP may be an ingress node (Ingress PE) for the DetNet flow to enter the DetNet domain. For example, as shown in FIG. 1, PE1 is the head node in the VPFP of flow1, PE2 is the head node in the VPFP of flow2, and PE3 is the head node in the VPFP of flow3.

As an embodiment, the tail node of the above VPFP may be an egress node (Egress PE) for the DetNet flow to flow out of the DetNet domain. For example, as shown in FIG. 1, PE5 is a tail node in the VPFP of flow1 and flow2 respectively, and PE4 is a tail node in the VPFP of flow3.

For example, flow1 shown in FIG. 1 is applied to this embodiment, and the VPFP of the flow1 may be (PE1, Intf0) f1 (P1, Intf3) f2 (P3, Intf3) f3 (P4, Intf2) f4 (PE5, Intf0).

In the VPFP of flow1, f1 represents a mapping relationship between the scheduling cycle of the target egress interface Intf0 for transmitting flow1 on PE1 and the scheduling cycle of the target egress interface Intf3 for transmitting flow1 on P1. Similarly, f2 represents a mapping relationship between the scheduling cycle of the target egress interface Intf3 for transmitting flow1 on P1 and the scheduling cycle of the target egress interface Intf3 for transmitting flow1 on P3; f3 represents a mapping relationship between the scheduling cycle of the target egress interface Intf3 for transmitting flow1 on P3 and the scheduling cycle of the target egress interface Intf2 for transmitting flow1 on P4; and f4 represents a mapping relationship between the scheduling cycle of the target egress interface Intf2 for transmitting flow1 on P4 and the scheduling cycle of the target egress interface Intf0 for transmitting flow1 on PE5.

Similarly, applied to this embodiment, the VPFP of the flow2 shown in FIG. 1 may be (PE2, Intf0) g1 (P1, intf3) f2 (P3, intf3) f3 (P4, intf2) f5 (PE5, Intf1); the VPFP of flow3 shown in FIG. 1 may be (PE3, intf0) h1 (P2, intf2) h2 (P3, intf3) h3 (P4, intf1) h4 (PE4, Intf0). g1, f5, h1, h2, h3 and h4 are similar to the description of the above f1 and f2 and the like.

At block 302, for the target egress interface on each node in VPFP, a target scheduling cycle for scheduling and transmitting the DetNet flow is planned.

In this embodiment, the target scheduling cycle of the target egress interface on any node other than a head node in the VPFP is determined based on the scheduling cycle mapping relationship between a previous hop node and the current node and the target scheduling cycle of the target egress interface on the previous hop node. Herein, the scheduling cycle mapping relationship is as described above, and specifically the scheduling cycle mapping relationship between any node (denoted as node a) other than the head node in the VPFP and a previous hop node (denoted as node b) refers to a mapping relationship between the scheduling cycle of the target egress interface for transmitting the DetNet flow on the previous hop node, i.e. the node b, and the scheduling cycle of the target egress interface for transmitting the DetNet flow on the node a.

For example, with any node, i.e. the node a, other than head node in VPFP as an example, the previous hop node of the node a is the node b, and the mapping relationship between the scheduling cycle of the target egress interface for transmitting the DetNet flow on the node b and the scheduling cycle of the target egress interface for transmitting the DetNet flow on the node a is represented by a mapping function f. If the target scheduling cycle of the target egress interface on the node b is k, based on the mapping function f, a scheduling cycle f(k) is determined from all scheduling cycles of the target egress interface on the node a and then taken as the target scheduling cycle of the target egress interface on the node a.

In this embodiment, the target scheduling cycle of the target egress interface on the head node in VPFP may be determined based on transmission resources for transmitting the DetNet flow and currently available transmission resources of the target egress interface on each node in the VPFP (abbreviated as available transmission resources). Relevant descriptions will be made below with two examples and will not be elaborated herein.

As an embodiment, the above described transmission resources (such as the transmission resources required for the DetNet flow, and the currently available transmission resources of the target egress interface on each node in VPFP and the like) may be characterized by bandwidth. Herein, the unit of the bandwidth is bits per second (bps), and accordingly, the unit of the above transmission resources is bps.

As another embodiment, the above transmission resources may not use bps as the measurement unit, but the measurement unit may be defined by bandwidth resources, duration of scheduling cycles, interface bandwidth, and storage resources of node, for example, high-speed on-chip cache in ASIC and the like. For example, the measurement unit may be a certain length of bytes. Illustratively, one measurement unit may be 64 bytes. It can be seen that in this embodiment, the above measurement unit is based on three dimensions of the duration of scheduling cycles, the interface bandwidth and the storage resource of nodes, which facilitates subsequent implementation of resource reservation. The following are all described using measurement unit as an example.

Based on the description above, as an embodiment, this embodiment may calculate the number of measurement units (also referred to as the transmission resources required for the planned transmission of the DetNet flow, which may be denoted as preset transmission resource S0, which represents S0 measure units as described above) required for transmission of the DetNet flow based on the transmission requirements of the DetNet flow (e.g., the maximum number of bytes permitted for transmission of the DetNet flow, etc.).

As an embodiment, for the target egress interface on each node in the VPFP, based on interface characteristics of the target egress interface and specifications of the node itself, a maximum transmission resource (based on the above measurement unit) corresponding to each scheduling cycle is configured for the target egress interface. For example, the duration of the scheduling cycle of the target egress interface on each node in the VPFP is 10 us. With 64 bytes as the above measurement unit, if the target egress interface is an interface of 400G, the target egress interface may have a maximum transmission resource of about 7812 measurement units in one scheduling cycle. Further, if the target egress interface is an interface of 100G, the target egress interface may have a maximum transmission resource of about 195 measurement units in one scheduling cycle; further, if the target egress interface is an interface of 1G, the target egress interface may have a maximum transmission resource of about 19 measurement units in one scheduling cycle.

As mentioned above, as an embodiment, at block 302, by firstly starting from one reference scheduling cycle (e.g. any scheduling cycle and the like of the target egress interface, which is described with an example in the following embodiment) of the target egress interface on the head node in the VPFP, based on a currently available transmission resource of the reference scheduling cycle and a transmission resource required for transmitting the DetNet flow in the reference scheduling cycle, whether the reference scheduling cycle is a candidate scheduling cycle for scheduling and transmitting the DetNet flow is determined; if not, by restarting from a next reference scheduling cycle of the head node, or changing the transmission resource required for transmitting the DetNet flow in the reference scheduling cycle, iteration is continued; if yes, with the transmission resource required for transmitting the DetNet flow in the reference scheduling cycle as a trial value, the candidate scheduling cycle of the head node is firstly taken as an input of a first mapping relationship in the VPFP to determine whether an available transmission resource corresponding to an output (the scheduling cycle of the target egress interface on the next hop node) of the mapping relationship is greater than or equal to the above trial value; if not, by restarting from a next reference scheduling cycle of the head node, or changing the transmission resource required for transmitting the DetNet flow in the reference scheduling cycle, iteration is continued; if yes, the output of the previous mapping relationship is subsequently taken as an input of a next mapping relationship to perform iteration so as to determine in sequence whether the available transmission resource corresponding to the output of each mapping relationship is greater than or equal to the above trial value. If one of the available transmission resources is not greater than or equal to the above trial value, the current iterative calculation is ended, and by restarting from a next reference scheduling cycle of the head node, or changing the transmission resource required for transmitting the DetNet flow in the reference scheduling cycle, iteration is continued; if all are greater than or equal to the above trial value, it is successfully determined that the target egress interface on each node in the VPFP has a target scheduling cycle for scheduling and transmitting the DetNet flow.

It is to be noted that, the transmission resource required for transmitting the DetNet flow in each reference scheduling cycle may be less than or equal to the above S0. Relevant descriptions will be made with an example below and will not be repeated herein.

At block 303, for each node in the VPFP, from the available transmission resource corresponding to the target scheduling cycle of the target egress interface on the node, a target transmission resource for transmitting the DetNet flow in the target scheduling cycle is reserved, so as to transmit the DetNet flow by using the target transmission resource allocated for each target scheduling cycle of the target egress interface on each node in the VPFP.

In this embodiment, once it is determined that the target egress interface on each node in the VPFP has at least one target scheduling cycle for transmitting the DetNet flow, a target transmission resource for transmitting the DetNet flow in the target scheduling cycle may be reserved directly from an idle transmission resource corresponding to the target scheduling cycle of the target egress interface on each node in the VPFP. This is equivalent to updating the idle transmission resource corresponding to the target scheduling cycle of the target egress interface on each node and the updated idle transmission resource is reduced by the above target transmission resource over the idle transmission resource before the update.

As an embodiment, at block 303, from the idle transmission resource corresponding to the target scheduling cycle of the target egress interface on each node in the VPFP, the target transmission resource for transmitting the DetNet flow in the target scheduling cycle is reserved, which is equivalent to establishing one Virtual Periodic Forwarding Channel (VPFC) for transmitting the DetNet flow. The VPFC relies on the VPFP, the target scheduling cycle of the target egress interface on each node in the VPFP and the target transmission resource for transmitting the DetNet flow in the target scheduling cycle. In this embodiment, the VPFC is carried in the VPFP, and one VPFP can carry multiple different VPFCs.

Furthermore, in this embodiment, in order to optimize the use of resources, multiple DetNet flows may be aggregated together to share one VPFC. For example, the scheduling cycle is cyclically scheduled. Assuming one cycle includes 10 scheduling cycles, and each with a duration of 10 us, the time for each scheduling cycle to cycle once is 100 us. If each scheduling cycle of the target egress interface on the head node in the VPFP is allocated with one measurement unit of the transmission resource, assuming, for the DetNet flow corresponding to a certain application, there is one measurement unit of data being regularly sent each 1 ms (1000 us) and the sending is within one scheduling cycle (taking the scheduling cycle 1 as an example), this is equivalent to the fact that the application only occupies the scheduling cycle 1 of the 10th cycle and the scheduling cycle 1 of the 20th cycle and so on. Based on this, one measurement unit of data of the DetNet flows corresponding to other applications can occupy the scheduling cycles 1 of the 1st to 9th cycles, the scheduling cycles 1 of the 11th to 19th cycles and so on. In this way, multiple DetNet flows can be converged together to share one VPFC. his embodiment is not limited to sharing of the VPFC.

Till now, the flow shown in FIG. 3 is completed.

From the flow shown in FIG. 3, it can be seen that, the present embodiment determines at least one target scheduling cycle of the target egress interface on each node in the VPFP for transmitting the DetNet flow, and from the available transmission resource corresponding to each target scheduling cycle of the target egress interface on each node in VPFP, reserves target transmission resource for transmitting the DetNet flow in the target scheduling cycle, so as to transmit the DetNet flow by using the target transmission resource allocated for each target scheduling cycle of the target egress interface on each node in the VPFP. In this way, scheduling conflicts among multiple DetNet flows can be avoided, and further, end-to-end jitter of the CSQF is reduced, thereby improving the accuracy of the DetNet flow transmission.

The following describes the above described mapping relationship between a scheduling cycle of a target egress interface on any node other than a tail node in the VPFP and a scheduling cycle of a target egress interface on a next hop node.

If each node (e.g. PE1, P1, P3, P4 and P5 in the VPFP of the flow1 shown in FIG. 1) in the VPFP is configured (divided) with n equal-length scheduling cycles, where n is greater than 1.

The mapping relationship between the scheduling cycle of the target egress interface on any node other than the tail node in the VPFP and the scheduling cycle of the target egress interface on the next hop node can be expressed by the following equation:

$$y = (x + k) \bmod n, \{x \mid 0 \le x < n,\ x \in N,\ n \in N\},$$

where x represents the scheduling cycle of the target egress interface on any node other than the tail node in the VPFP; and y represents the scheduling cycle of the target egress interface on the next hop node of any node other than the tail node in the VPFP, where the relationship between y and x satisfies the above mapping relationship. k is a constant which can be set based on the jitter range between nodes, for example, k takes values in a range of 0k<n, k∈N, n∈N, where N denotes a natural number.

For example, assuming each node in the VPFP of flow1 shown in FIG. 1 is configured with 8 equal-length scheduling cycles, the mapping relationship between the scheduling cycle of the target egress interface on any node other than the tail node in the VPFP and the scheduling cycle of the target egress interface on the next hop node may be one of the following 8 mapping relationships respectively:

$$y = (x + 0) \bmod 8, \{x \mid 0 \le x < 8,\ x \in N\};$$

$$y = (x + 1) \bmod 8, \{x \mid 0 \le x < 8,\ x \in N\};$$

$$y = (x + 2) \bmod 8, \{x \mid 0 \le x < 8,\ x \in N\};$$

-continued $$y = (x + 3) \bmod 8, \{x \mid 0 \le x < 8,\ x \in N\};$$

$$y = (x + 4) \bmod 8, \{x \mid 0 \le x < 8,\ x \in N\};$$

$$y = (x + 5) \bmod 8, \{x \mid 0 \le x < 8,\ x \in N\};$$

$$y = (x + 6) \bmod 8, \{x \mid 0 \le x < 8,\ x \in N\};$$

$$y = (x + 7) \bmod 8, \{x \mid 0 \le x < 8,\ x \in N\}.$$

Specifically, in the flow1 shown in FIG. 1, f1 may be expressed by the following equation: f1 (x)=(x+3) mod 8, {x|0≤x≤8, x∈N}; f2 may be expressed by the following equation: f2 (x)=(x+1) mod 8, {x|0≤x≤8, x∈N}; f3 may be expressed by the following equation: f3 (x)=(x+2) mod 8, {x|0≤x≤8, x∈N}; f4 may be expressed by the following equation: f4 (x)=(x+4) mod 8, {x|0≤x≤8, x∈N}. The g1, f2, f3, f5 in the VPFP of flow2 shown in FIG. 1 and the h1, h2, h3, h4 in the VPFP of flow3 are similar and thus will not be described redundantly herein.

The above descriptions are made to the above mapping relationship. In this embodiment, the mapping relationship may be an injective function, which represents that any scheduling cycle of the target egress interface on one node other than the tail node in the VPFP is mapped to a unique scheduling cycle of the target egress interface on the next hop node.

The following describes the available transmission resource of the above target scheduling interface in each scheduling cycle.

In this embodiment, for ease of recording, the available transmission resource corresponding to any target egress interface in each scheduling cycle may be represented by a scheduling cycle resource organization structure. Herein, the scheduling cycle resource organization structure may be expressed in the following formula: (node identifier, interface identifier, scheduling cycle):(available transmission resource, initial transmission resource), where the units of the available transmission resource and the initial transmission resource both can be the above measurement unit.

With PE1 shown in FIG. 1 as an example, if Intf0 of PE1 is an interface of 10G, the number of scheduling periods that Intf0 on PE1 is configured with is 8, and the duration of each scheduling cycle is 10 us. The maximum available transmission resource in each scheduling cycle of Intf0 on PE1 is about 195 measurement units. Considering factors such as the actual scheduling cost and the like, the maximum available transmission resource in each scheduling cycle of the Intf0 on PE1 may be set to about 180 measurement units. Of course, the initial transmission resource in each scheduling cycle of the Intf0 on PE1 is 180 measurement units. Based on this, initially, the scheduling cycle resource organization structure of the Intf0 on PE1 is as follows:

(PE1, Intf0, Cycle0):(180, 180);
(PE1, Intf0, Cycle1):(180, 180);
(PE1, Intf0, Cycle2):(180, 180);
(PE1, Intf0, Cycle3):(180, 180);
(PE1, Intf0, Cycle4):(180, 180);
(PE1, Intf0, Cycle5):(180, 180);
(PE1, Intf0, Cycle6):(180, 180);
(PE1, Intf0, Cycle7):(180, 180).

With P1 shown in FIG. 1 as an example, if Intf3 of P1 is an interface of 100G, the number of scheduling periods that Intf3 on P1 is configured with is 8, and the duration of each scheduling cycle is 10 us. The maximum available transmission resource in each scheduling cycle is about 1953 above measurement units. Considering factors such as the actual scheduling cost and the like, the maximum available transmission resource in each scheduling cycle of Intf3 on P1 may be set to about 1900 measurement units. Correspondingly, the initial transmission resource in each scheduling cycle of Intf3 on P1 is 1900 measurement units. Based on this, initially, the scheduling cycle resource organization structure of Intf3 on P1 is as follows:

(P1, Intf3, Cycle0):(1900, 1900);
(P1, Intf3, Cycle1):(1900, 1900);
(P1, Intf3, Cycle2):(1900, 1900);
(P1, Intf3, Cycle3):(1900, 1900);
(P1, Intf3, Cycle4):(1900, 1900);
(P1, Intf3, Cycle5):(1900, 1900);
(P1, Intf3, Cycle6):(1900, 1900);
(P1, Intf3, Cycle7):(1900, 1900).

It should be noted that, in this embodiment, the available transmission resource of the target egress interface in each scheduling cycle may be changed. For example, taking Intf0 on PE1 as an example, when the above transmission resource S0 is reserved from the available transmission resource corresponding to Cycle7 of Intf0 on PE1 to transmit the flow1 by the above described block 303, then at this time, the available transmission resource in Cycle 7 of Intf0 on PE1 may be changed and the changed available transmission resource is reduced by the above transmission resource S0 over the unchanged available transmission resource. If S0 is 50 measurement units, the available transmission resource in Cycle7 of Intf0 on PE1 is changed from 180 to 130, and correspondingly, (PE1, Intf0, Cycle7): (180, 180) in the scheduling cycle resource organization structure corresponding to Intf0 on PE1 may be changed to (PE1, Intf0, Cycle7):(130, 180). Descriptions will be made with an example on how to perform resource reservation below and will not be repeated herein.

Descriptions will be made below to the block 302 of planning the target scheduling cycle for scheduling and transmitting the DetNet flow for the target egress interface on each node in the VPFP.

In this embodiment, a scheduling cycle may be specified based on actual requirements to schedule and transmit the DetNet flow, which is denoted as a specified scheduling cycle scenario. In the specified scheduling cycle scenario, at least one scheduling cycle of the target egress interface on the head node in the VPFP may be specified to schedule and transmit the DetNet flow, where the at least one scheduling cycle may be referred to as a specified scheduling cycle. The implementation of above block 302 will be described below based on the specified scheduling cycle scenario.

Figure 4:
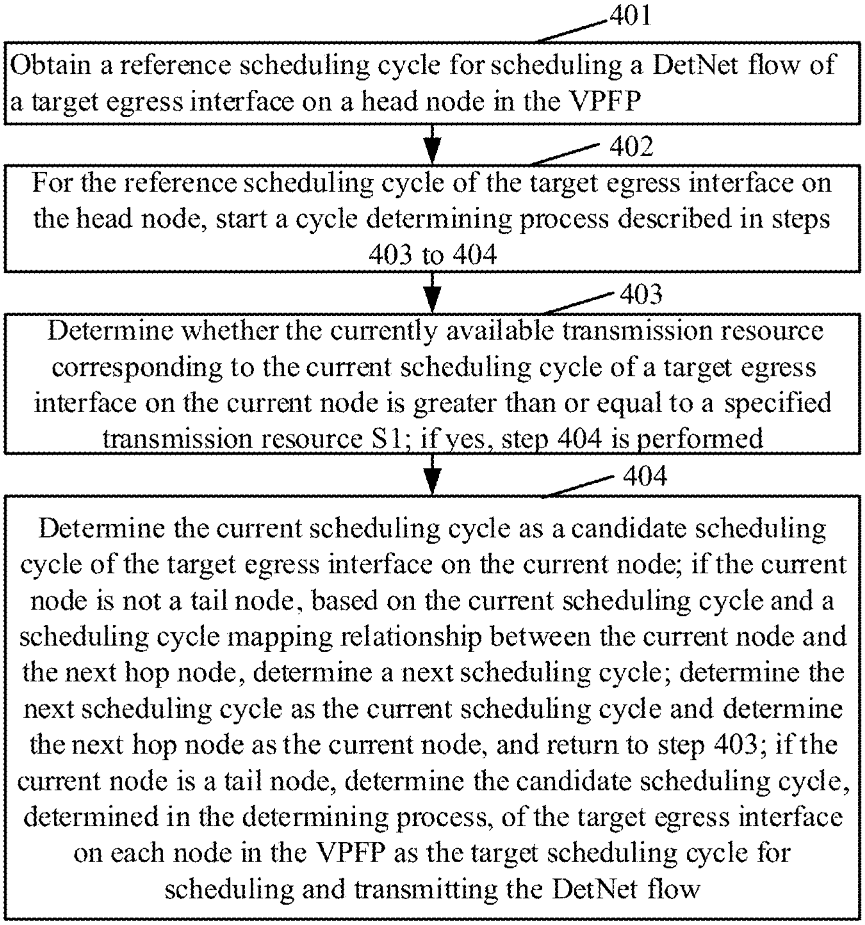
FIG. 4 is a flowchart illustrating implementation of block 302 according to an embodiment of the present disclosure.

Referring to FIG. 4, FIG. 4 is a flowchart of the implementation of block 302 provided by an embodiment of the present disclosure. As shown in FIG. 4, the flow may include the following blocks.

At block 401, a reference scheduling cycle for scheduling a DetNet flow of a target egress interface on a head node in the VPFP is obtained.

In this embodiment, the reference scheduling cycle includes at least one scheduling cycle of the target egress interface for transmitting the DetNet flow on the head node in the VPFP. In a specified scheduling cycle scenario, the reference scheduling cycle herein may be a specified scheduling cycle.

At block 402, for the reference scheduling cycle of the target egress interface on the head node, a cycle determining process described in blocks 403 to 404 is started.

As an embodiment, when the number of the reference scheduling cycles of the target egress interface on the head node is 1, the processes of blocks 403 to 404 may be performed for the reference scheduling cycle; if the number of the reference scheduling cycles of the target egress interface on the head node is greater than 1, the reference scheduling cycles are traversed in a specified sequence, for example, in an ascending order of reference scheduling cycle serial numbers, and the processes of blocks 403 to 404 are performed for the traversed reference scheduling cycle; when the processes are completed, the above reference scheduling cycles are continued being traversed until all reference scheduling cycles are traversed.

At block 403, it is determined whether the currently available transmission resource corresponding to the current scheduling cycle of a target egress interface on the current node is greater than or equal to a specified transmission resource S1; if yes, block 404 is performed.

As mentioned above, the scheduling cycle resource organization structure of each node is (node identifier, interface identifier, scheduling cycle):(available transmission resource, initial transmission resource). Thus, based on the scheduling cycle resource organization structure of the target egress interface on the current node, whether the currently available transmission resource corresponding to the current scheduling cycle is greater than or equal to the specified transmission resource S1 may be determined at block 403. Of course, if it is determined that the currently available transmission resource corresponding to the current scheduling cycle is less than the above described specified transmission resource S1, the present cycle determining process may be ended directly.

In this embodiment, the above specified transmission resource S1 represents a resource required for transmitting the DetNet flow in the reference scheduling cycle, which is specified for the DetNet flow, and is less than or equal to the transmission resource required for transmitting the DetNet flow in one complete scheduling (preset transmission resource S0). The specified transmission resource S1 herein is the resource required for performing transmission in the one reference scheduling cycle, and the specified transmission resources S1 in different reference scheduling cycles may be different. The preset transmission resource S0 as mentioned above is the transmission resource required for transmitting the DetNet flow in one complete scheduling. If a complete scheduling transmission only includes one above reference scheduling cycle, the specified transmission resource S1 is equal to the preset transmission resource S0; if the complete scheduling transmission includes two or more reference scheduling cycles, the specified transmission resource S1 is less than the preset transmission resource S0; the sum of the specified transmission resources S1 in all reference scheduling cycles is equal to the preset transmission resource S0.

At block 404, the current scheduling cycle is determined as a candidate scheduling cycle of the target egress interface on the current node; if the current node is not a tail node, based on the current scheduling cycle and a scheduling cycle mapping relationship between the current node and the next hop node, a next scheduling cycle is determined; the next scheduling cycle is determined as the current scheduling cycle and the next hop node is determined as the current node, and block 403 is returned to; if the current node is a tail node, the candidate scheduling cycle, determined in the determining process, of the target egress interface on each node in the VPFP is determined as the target scheduling cycle for scheduling and transmitting the DetNet flow.

For example, if the scheduling cycle mapping relationship (i.e. mapping function) between the current node and the next hop node is f and the current scheduling cycle is j, the scheduling cycle f (j) of the target egress interface on the next hop node is determined as the next scheduling cycle.

Finally, by the flow shown in FIG. 4, the target scheduling cycle for transmitting the DetNet flow of each node in the VPFP is determined.

The following example is described by way of the embodiment 1 in conjunction with the resource demand list and the flow shown in FIG. 4.

Embodiment 1

In the embodiment 1, a business flow demand of the DetNet flow may be firstly converted into at least one resource demand to facilitate resource reservation. A combination of the converted resource demands is the above business flow demand of the DetNet flow. The conversion manner may be set based on actual demands and will not be redundantly described herein.

In order to help manage the converted resource demands, the converted resource demands may be recorded in the resource demand list in the form of, for example, (resource demand 1, resource demand 2, . . . ).

In this embodiment, a structure of each resource demand may be:

(VPFP):(egress interface, scheduling cycle, resource demand count, and minimum resource number).

In the above structure, "VPFP" represents a VPFP of a DetNet flow, for example, the VPFP of flow1 in FIG. 1. It can be seen that, in this embodiment, each resource demand has an associated VPFP. Certainly, multiple different resource demands may be associated with a same VPFP or different VPFPs, which is not limited in this embodiment and depends on the actual service requirements of the DetNet flow.

In the above structure, "egress interface" represents an interface for transmitting the above DetNet flow on the head node in VPFP, namely, the above target egress interface.

In the specified scheduling cycle scenario, the "scheduling cycle" in the above structure indicates a specified scheduling cycle for scheduling and transmitting the above DetNet flow of the target egress interface on the head node.

In the above structure, the "resource demand count" refers to transmission resources required for transmitting the DetNet flow within the "scheduling cycle" in the structure, namely, the above specified transmission resource S1. The "minimum resource number" is set in such a way that a same data packet of the DetNet flow is not scheduled and transmitted across scheduling cycles. For example, two measurement units of transmission resources are required for transmitting each data packet of the DetNet flow, and thus the "minimum resource number" may be set to 2, namely, at least two measurement units of transmission resources are allocated for a same scheduling cycle.

In this embodiment, for ease of descriptions, the structure of the above resource demand, (VPFP):(egress interface, scheduling cycle, resource demand account, minimum resource number), may be simply denoted as (VPFP):(oif, cycle, res, min).

In the VPFP described above, oif represents the above target egress interface, cycle represents the above specified scheduling cycle, res represents the above resource demand account, and min represents the above minimum resource number, where res is greater than or equal to min.

For example, for the DetNet flow, if scheduling cycles Cycle0~7 of the target egress interface (e.g. intf0) on the head node in VPFP are specified for scheduling and transmitting the DetNet flow, the transmission resource required for transmitting the DetNet flow in any one of the scheduling cycles Cycle0~7 is one measurement unit of transmission resources. Further, if the "minimum resource number" for scheduling and transmitting the DetNet flow in the scheduling cycle is one measurement unit of transmission resources, each resource demand in the resource demand list corresponding to the DetNet flow may be expressed as follows:

```
{
  (VPFP): (intf0, Cycle0, 1, 1);
  (VPFP): (intf0, Cycle1, 1, 1);
  (VPFP): (intf0, Cycle2, 1, 1);
  (VPFP): (intf0, Cycle3, 1, 1);
  (VPFP): (intf0, Cycle4, 1, 1);
  (VPFP): (intf0, Cycle5, 1, 1);
  (VPFP): (intf0, Cycle6, 1, 1);
  (VPFP): (intf0, Cycle7, 1, 1);
}.
```

Based on the above descriptions, the embodiment 1 is described below by still using the network shown in FIG. 1.

It is assumed that the VPFP (denoted VPFP1) of the flow1 in FIG. 1 is: (PE1, Intf0) f1 (P1, Intf3) f2 (P3, Intf3) f3 (P4, Intf2) f4 (PE5, Intf0). The resource demand list corresponding to flow1 is as follows:

```
{
  (VPFP1): (intf0, Cycle0, 1, 1);
  (VPFP1): (intf0, Cycle1, 1, 1);
  (VPFP1): (intf0, Cycle2, 1, 1);
  (VPFP1): (intf0, Cycle3, 1, 1);
  (VPFP1): (intf0, Cycle4, 1, 1);
  (VPFP1): (intf0, Cycle5, 1, 1);
  (VPFP1): (intf0, Cycle6, 1, 1);
  (VPFP1): (intf0, Cycle7, 1, 1);
}
```

Figure 5:
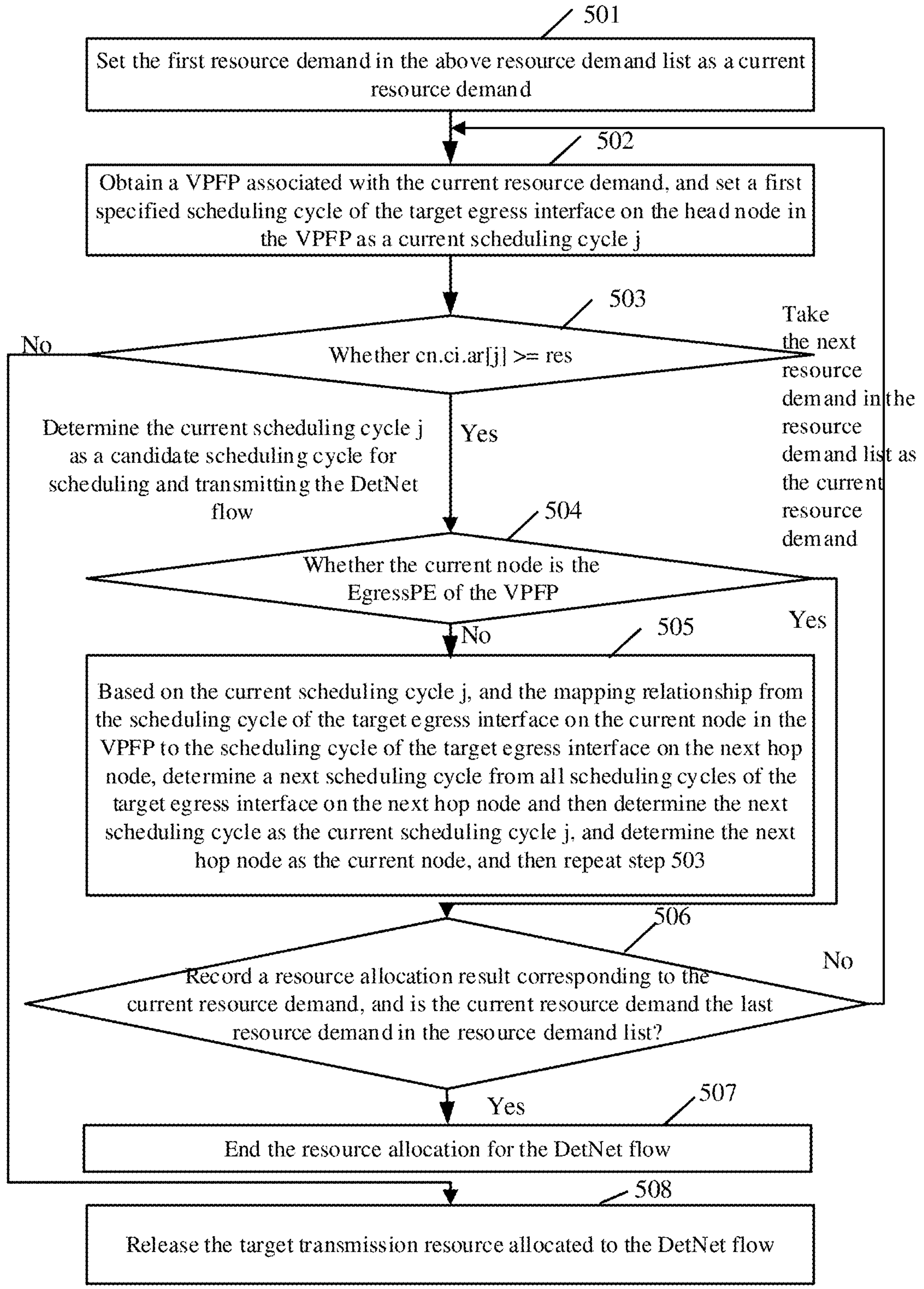
FIG. 5 is a flowchart of a method embodiment according to an embodiment of the present disclosure.

For the above resource demand list, the processing flow shown in FIG. 5 is performed.

At block 501, the first resource demand in the above resource demand list is set as a current resource demand, and then block 502 is performed.

Tis embodiment may be carried out by starting from the first resource demand or in another sequence, which is not limited herein.

At block 502, a VPFP associated with the current resource demand is obtained, and a first specified scheduling cycle of the target egress interface on the head node in the VPFP is set as a current scheduling cycle j.

Herein, in a case of (VPFP1):(intf0, Cycle0, 1, 1), the VPFP associated with the current resource demand is the VPFP1 in the current resource demand. The head node in the VPFP1 is denoted as IngressPE, the target egress interface on the head node in the VPFP1 is intf0, and the last node in the VPFP1 is a tail node denoted as EgressPE.

If there are multiple specified scheduling cycles for the target egress interface on the head node in the VPFP, search is performed by starting from the first specified scheduling cycle among the multiple specified scheduling cycles in the block 502 or in another sequence, which is not limited herein.

At block 503, if cn.ci.ar[j]>=res, the current scheduling cycle j is determined as a candidate scheduling cycle for scheduling and transmitting the DetNet flow of the target egress interface on the current node, and block 504 is performed; if not, block 508 is performed.

Wherein cn.ci.ar [j] represents currently available transmission resource corresponding to the current scheduling cycle j of the target egress interface on the current node. res is the resource demand count in the current resource demand, which represents the transmission resource required for transmitting the DetNet flow in the current scheduling cycle, namely, the above specified transmission resource S1.

If cn.ci.ar[j]>=res, it indicates that the currently available transmission resource corresponding to the current scheduling cycle j satisfies the transmission resource required for transmitting the DetNet flow in the current scheduling cycle, and at this time, the current scheduling cycle j may be directly determined as the candidate scheduling cycle for scheduling and transmitting the DetNet flow of the target egress interface on the current node.

At block 504, if the current node is not the EgressPE of the VPFP, block 505 is performed; if the current node is the EgressPE of the VPFP, block 506 is performed.

At block 505, based on the current scheduling cycle j, and the mapping relationship from the scheduling cycle of the target egress interface on the current node in the VPFP to the scheduling cycle of the target egress interface on the next hop node, a next scheduling cycle is determined from all scheduling cycles of the target egress interface on the next hop node and then the next scheduling cycle is determined as the current scheduling cycle j, and the next hop node is determined as the current node, and then block 503 is repeated.

For example, if the mapping relationship (i.e. mapping function) is f and the current scheduling cycle is j, the scheduling cycle f (j) of the target egress interface on the next hop node is taken as a next scheduling cycle.

At block 506, a resource allocation result corresponding to the current resource demand is recorded, if the current resource demand is the last resource demand in the resource demand list, it indicates that all resource demands are satisfied and block 507 is performed; otherwise, the next resource demand in the resource demand list is taken as the current resource demand and block 502 is repeated.

The block 506 is performed on the premise that the current node is the EgressPE of the VPFP. If the current node is the EgressPE of the VPFP, it indicates that each node in the entire path of the VPFP associated with the current resource demand satisfies the current resource demand. At this time, as an embodiment, the candidate scheduling cycle of the target egress interface of each node in the VPFP associated with the current resource demand is determined as the target scheduling cycle, and the resource allocation result corresponding to the current resource demand is recorded in block 506.

In this embodiment, the resource allocation result includes the VPFP associated with the current resource demand, the target egress interface for transmitting the DetNet flow on the head node in the VPFP, the target scheduling cycle for scheduling and transmitting the DetNet flow of the target egress interface, and the target transmission resource for scheduling and transmitting the DetNet flow within the target scheduling cycle. Herein, the target transmission resource is the above res (i.e. the above specified transmission resource S1).

As an embodiment, the resource allocation result may be expressed in the following formula: (VPFP):(target egress interface, target scheduling cycle, target transmission resource). In a specific implementation, the resource allocation result may be recorded in a resource allocation result list, the structure of which can be expressed as: {Result1, Result2, . . . }.

For example, the VPFP (denoted as VPFP1) of the flow1 in FIG. 1 is VPFP1: (PE1, Intf0) f1 (P1, Intf3) f2 (P3, Intf3) f3 (P4, Intf2) f4 (PE5, Intf0). The resource demand list corresponding to the flow1 is as described above. With reference to the above resource allocation result, a resource demand allocation result list herein may be:

```
{
  (VPFP): (intf0, Cycle0, 1);
  (VPFP): (intf0, Cycle1, 1);
  (VPFP): (intf0, Cycle2, 1);
  (VPFP): (intf0, Cycle3, 1);
  (VPFP): (intf0, Cycle4, 1);
  (VPFP): (intf0, Cycle5, 1);
  (VPFP): (intf0, Cycle6, 1);
  (VPFP): (intf0, Cycle7, 1);
}
```

At block 507, the resource allocation for the DetNet flow is ended.

At block 508, the target transmission resource allocated to the DetNet flow is released.

Applied to the above resource allocation result list, the target transmission resource corresponding to the target scheduling cycle of the target egress interface on each node in the VPFP indicated in each resource allocation result is released.

Till now, the flow shown in FIG. 5 is completed.

Through the flow shown in FIG. 5, the target scheduling cycle of the target egress interface on each node in the VPFP is determined in the specified scheduling cycle scenario.

In this embodiment, the scheduling cycle of the DetNet flow may not be specified, which means any scheduling cycle of the target egress interface on the head node in the VPFP may be used for scheduling and transmitting the determinist flow. This scenario may be referred to as a non-specified scheduling cycle scenario. The process in which the block 302 is achieved in the non-specified scheduling cycle scenario is described below.

Figure 6:
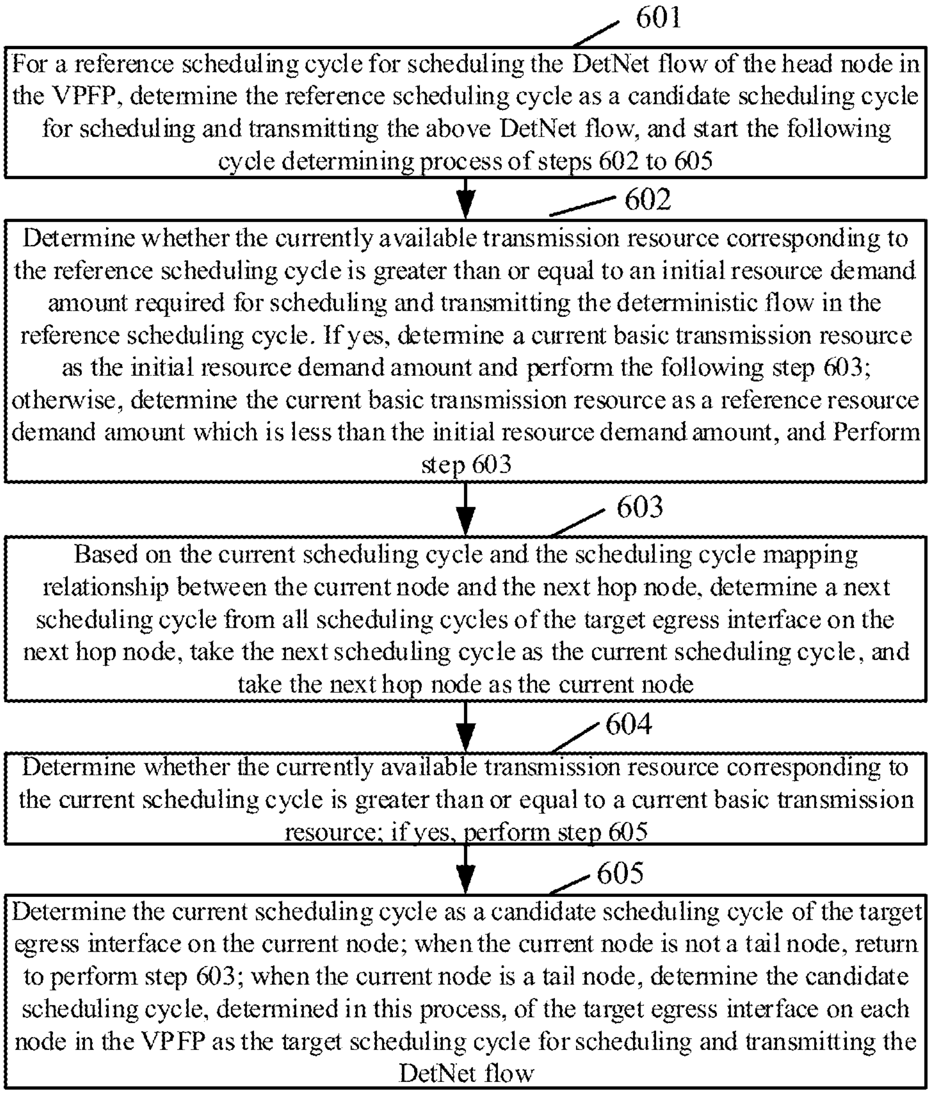
FIG. 6 is another flowchart illustrating implementation of block 302 according to an embodiment of the present disclosure.

FIG. 6 is another implementation flowchart of block 302 provided by an embodiment of the present disclosure. As shown in FIG. 6, the flow may include the following blocks.

At block 601, for a reference scheduling cycle for scheduling the DetNet flow of the head node in the VPFP, the reference scheduling cycle is determined as a candidate scheduling cycle for scheduling and transmitting the above DetNet flow, and the following cycle determining process of blocks 602 to 605 is started.

In a non-specified scheduling cycle scenario, the format of the corresponding resource demand may be (VPFP): (oif, InvalidCycle, res, min), where VPFP, oif, res, and min are all described as above. And the InvalidCycle represents a non-specified scheduling cycle. It should be noted that, the InvalidCycle is used to represent the non-specified scheduling cycle only for ease of descriptions but not limited hereto and thus, the non-specified scheduling cycle may also be represented by another name or symbol.

Based on this, as an embodiment, each scheduling cycle of the target egress interface on the head node in the VPFP is traversed. If the currently available transmission resource corresponding to the scheduling cycle is greater than or equal to the above min, the scheduling cycle is determined as a reference scheduling cycle, and block 601 is performed for the reference scheduling cycle.

As another embodiment, at least one reference scheduling cycle is selected from all scheduling cycles of the target egress interface on the head node in the VPFP, where the currently available transmission resource corresponding to the selected reference scheduling cycle is greater than or equal to the above min. Then, the above block 601 is performed for each reference scheduling cycle.

At block 602, it is determined whether the currently available transmission resource corresponding to the reference scheduling cycle is greater than or equal to an initial resource demand amount required for scheduling and transmitting the DetNet flow in the reference scheduling cycle. If yes, a current basic transmission resource is determined as the initial resource demand amount and the following block 603 is performed; otherwise, the current basic transmission resource is determined as a reference resource demand amount which is less than the initial resource demand amount, and block 603 is performed.

As an embodiment, if the reference scheduling cycle is a first scheduling cycle, for which the above cycle determining process is performed, of the target egress interface on the head node, the initial resource demand amount may be a specified transmission resource S2 specified for scheduling and transmitting the DetNet flow in the reference scheduling cycle. For example, the specified transmission resource S2 may be a resource demand number res in the current resource demand. Corresponding to the resource demand format under the non-specified scheduling cycle scenario described above, if the resource demand is (VPFP1): (intf0, InvalidCycle, 10, 2), the specified transmission resource S2 may be 10 measurement units.

As another embodiment, if the reference scheduling cycle is not the first scheduling cycle, for which the above cycle determining process is performed, of the target egress interface on the head node, the above initial resource demand amount is determined based on S2 and d0. Herein, d0 represents a sum of the target transmission resources required for transmitting the DetNet flow in the determined target scheduling cycles of the target egress interface on the head node. For example, if a difference between S2 and d0 is greater than or equal to the above min, the initial resource demand amount may be the difference between S2 and d0; if the difference between S2 and d0 is less than the above min, the initial resource demand amount may be min. The relevant details may be referred to the following embodiment 2 and will not be repeated herein.

In this embodiment, the reference resource demand amount is represented by a product of k2 and min (i.e. k2*min), where k2=⌊cn.ci.ar[c]/min⌋, wherein cn.ci.ar[c] represents currently available transmission resource corresponding to the reference scheduling cycle, min has the meaning as above, and ⌊ ⌋ represents rounding.

At block 603, based on the current scheduling cycle and the scheduling cycle mapping relationship between the current node and the next hop node, a next scheduling cycle is determined from all scheduling cycles of the target egress interface on the next hop node, the next scheduling cycle is taken as the current scheduling cycle, and the next hop node is taken as the current node.

For example, if the scheduling cycle mapping relationship (i.e. mapping function) between the current node and the next node is f and the current scheduling cycle is j, the scheduling cycle f (j) of the target egress interface on the next hop node is taken as the next scheduling cycle.

At block 604, whether the currently available transmission resource corresponding to the current scheduling cycle is greater than or equal to a current basic transmission resource is determined; if yes, block 605 is performed.

As an embodiment, if it is found in the block 604 that the currently available transmission resource corresponding to the current scheduling cycle is less than the current basic transmission resource, further operations may be performed: checking whether the currently available transmission resource corresponding to the current scheduling cycle satisfies preset resource update conditions; if yes, updating the current basic transmission resource, where the updated current basic transmission resource is less than the current basic transmission resource before the update; then, returning to perform block 604.

As an embodiment, checking whether the currently available transmission resource corresponding to the current scheduling cycle satisfies the preset resource update condition may include: calculating ⌊cn.ci.ar[j]/min⌋ to obtain a calculation result k1; if k1 is greater than 0, determining the currently available transmission resource corresponding to the current scheduling cycle satisfies the resource update conditions; otherwise, determining the currently available transmission resource corresponding to the current scheduling cycle does not satisfy the resource update conditions. As mentioned above, cn.ci.ar[j] represents the currently available transmission resource corresponding to the current scheduling cycle, and min has the meaning as described above. Correspondingly, the updated current basic transmission resource is a product of k1 and min (i.e. k1*min).

It should be noted that, in this embodiment, if it is found that the currently available transmission resource corresponding to the current scheduling cycle does not satisfy the preset resource update conditions, the process for the current candidate scheduling cycle of the head node is ended; when the current candidate scheduling cycle is not the last reference scheduling cycle of the head node, the above process is continued for a next reference scheduling cycle of the head node based on the flow shown in FIG. 6.

At block 605, the current scheduling cycle is determined as a candidate scheduling cycle of the target egress interface on the current node; when the current node is not a tail node, return to perform block 603; when the current node is a tail node, the candidate scheduling cycle, determined in this process, of the target egress interface on each node in the VPFP is determined as the target scheduling cycle for scheduling and transmitting the DetNet flow.

Finally, based on the flow shown in FIG. 6, the target scheduling cycle for transmitting the DetNet flow of the target egress interface on each node in the VPFP is determined.

The embodiment 2 will be described with an example in combination with the resource demand list and the flow shown in FIG. 6.

Embodiment 2 in the non-specified scheduling cycle scenario, in this embodiment 2, the scheduling cycle in the resource demand is not a specified scheduling cycle, and the scheduling cycle for transmitting the DetNet flow of the target egress interface on the head node is no longer specified. For example, with the flow1 in the network shown in FIG. 1 as an example, in the non-specified scheduling cycle scenario, the resource list DemandList of the flow1 may be expressed as: {(VPFP): (intf0, InvalidCycle, 10, 2)}, where InvalidCycle represents a non-specified scheduling cycle.

In order to make the embodiment 2 clearer, descriptions are made with a resource demand list of a DetNet flow (denoted as flow4). The resource demand list of the flow4 may be:

```
{
  (VPFP1): (intf0, InvalidCycle, 10, 2);
  (VPFP2): (intf0, InvalidCycle, 8, 2);
}
```

The VPFP1 may specifically be: (PE1, Intf0) f1 (P1, Intf3) f2 (P3, Intf3) f3 (P4, Intf2) f4 (PE5, Intf0). The VPFP2 may specifically be: (PE2, Intf0) g1 (P1, intf3) f2 (P3, intf3) f3 (P4, intf2) f5 (PE5, Intf1).

Figure 7:
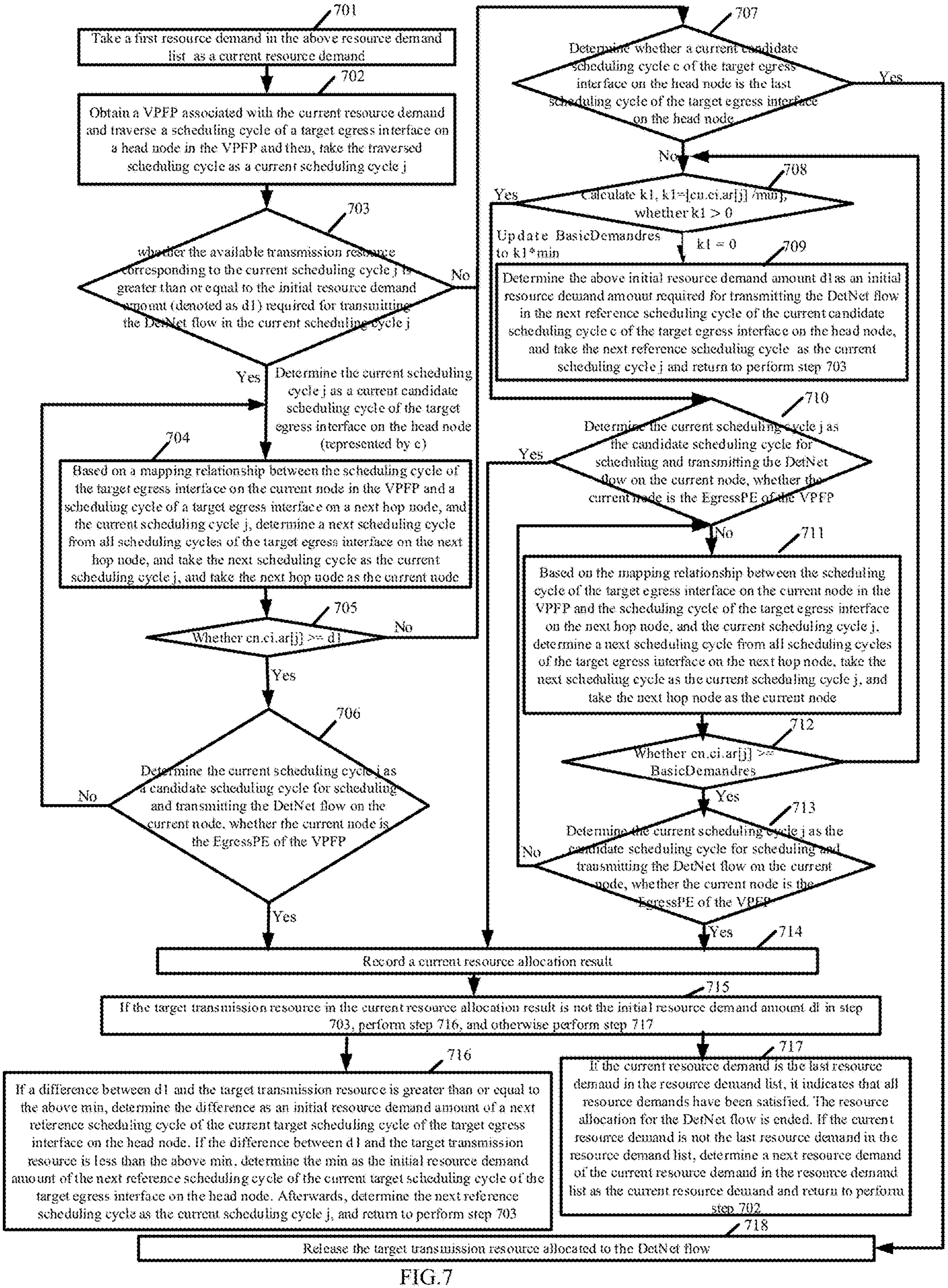
FIG. 7 is a flowchart of another method embodiment according to an embodiment of the present disclosure.

For the above resource demand list, the following processing flow shown in FIG. 7 is performed.

At block 701, a first resource demand in the above resource demand list is taken as a current resource demand.

Tis embodiment is carried out by starting from the first resource demand or in another sequence, which is not limited herein.

At block 702, a VPFP associated with the current resource demand is obtained, and a scheduling cycle of a target egress interface on a head node in the VPFP is traversed and then, the traversed scheduling cycle is taken as a current scheduling cycle j.

Herein, if the current resource demand is (VPFP1):(intf0, InvalidCycle, 10, 2), the VPFP associated with the current resource demand is the VPFP1, where the target egress interface on the head node in the VPFP1 is intf0. The head node in the VPFP1 is denoted as IngressPE, and the last node in the VPFP1 is a tail node denoted as EgressPE.

In the block 702, traversal is performed by starting from the first scheduling cycle of the target egress interface on the head node or in another order, which is not limited herein.

At block 703, it is determined whether the available transmission resource corresponding to the current scheduling cycle j is greater than or equal to the initial resource demand amount (denoted as d1) required for transmitting the DetNet flow in the current scheduling cycle j; if yes, the current scheduling cycle j is determined as a current candidate scheduling cycle of the target egress interface on the head node (represented by c), and block 704 is performed; otherwise, block 707 is performed.

If the current scheduling cycle j is the first scheduling cycle of the target egress interface intf0 on the head node, the initial resource demand amount d1 required for transmitting the DetNet flow in the current scheduling cycle j may be a resource demand number res (denoted as specified transmission resource S2) in the current resource demand. For example, if the current resource demand is (VPFP1): (intf0, InvalidCycle, 10, 2), the resource demand number res (denoted as specified transmission resource S2) in the current resource demand may be 10 measurement units.

If the current scheduling cycle j is not the first scheduling cycle of the target egress interface intf0 on the head node, the initial resource demand amount d1 required for transmitting the DetNet flow in the current scheduling cycle j is not the above S2 (which is less than S2). Details may be referred to the descriptions of the block 713 and will not be described herein.

At block 704, based on a mapping relationship between the scheduling cycle of the target egress interface on the current node in the VPFP and a scheduling cycle of a target egress interface on a next hop node, and the current scheduling cycle j, a next scheduling cycle is determined from all scheduling cycles of the target egress interface on the next hop node, and the next scheduling cycle is taken as the current scheduling cycle j, and the next hop node is taken as the current node. Then, block 705 is performed.

For example, if the mapping relationship (i.e. mapping function) is f, and the current scheduling cycle is j, the scheduling cycle f (j) of the target egress interface on the next hop node is determined as a next scheduling cycle, and the next scheduling cycle is taken as the current scheduling cycle j.

At block 705, if cn.ci.ar[j]>=d1, block 706 is performed; otherwise, block 707 is performed.

In the block 705, cn.ci.ar[j] represents the currently available transmission resource corresponding to the current scheduling cycle j of the target egress interface on the current node, and d1 is as mentioned above.

At block 706, the current scheduling cycle j is determined as a candidate scheduling cycle for scheduling and transmitting the DetNet flow on the current node; if the current node is not the EgressPE of the VPFP, return to perform block 704; if the current node is the EgressPE of the VPFP, block 714 is performed.

At block 707, whether a current candidate scheduling cycle c of the target egress interface on the head node is the last scheduling cycle of the target egress interface on the head node is determined; if not, block 708 is performed, and if yes, block 718 is performed.

At block 708, k1(k1=⌊cn.ci.ar[j]/min⌋) is calculated. If k1 is 0, block 709 is performed; if k1 is greater than 0, a current basic transmission resource (denoted as BasicDemandres) is determined as a product of k1 and min (k1*min), and then block 710 is performed.

Herein, cn.ci.ar[j] is as mentioned above; ⌊ ⌋ represents rounding; min represents a minimum resource number in the current resource demand. For example, if the current resource demand is (VPFP1):(intf0, InvalidCycle, 10, 2), the min is two measurement units.

At block 709, the above initial resource demand amount d1 is determined as an initial resource demand amount required for transmitting the DetNet flow in the next reference scheduling cycle of the current candidate scheduling cycle c of the target egress interface on the head node, and the next reference scheduling cycle is taken as the current scheduling cycle j and return to perform block 703.

At block 710, the current scheduling cycle j is determined as the candidate scheduling cycle for scheduling and transmitting the DetNet flow on the current node; if the current node is not the EgressPE of the VPFP, block 711 is performed; if the current node is the EgressPE of the VPFP, block 714 is performed.

At block 711, based on the mapping relationship between the scheduling cycle of the target egress interface on the current node in the VPFP and the scheduling cycle of the target egress interface on the next hop node, and the current scheduling cycle j, a next scheduling cycle is determined from all scheduling cycles of the target egress interface on the next hop node, the next scheduling cycle is taken as the current scheduling cycle j, and the next hop node is taken as the current node. Then, block 712 is performed.

The block 711 is similar to the above block 704 and thus will not be described in detail.

At block 712, if cn.ci.ar[j]>=BasicDemandres, block 713 is performed; otherwise, return to perform block 708.

In this block 712, cn.ci.ar [j] and BasicDemandres are as mentioned above.

At block 713, the current scheduling cycle j is determined as the candidate scheduling cycle for scheduling and transmitting the DetNet flow on the current node; if the current node is not the EgressPE of the VPFP, return to perform block 711; and if the current node is the EgressPE of the VPFP, block 714 is performed.

At block 714, a current resource allocation result is recorded.

The block 714 is performed on the premise that the current node is the EgressPE of the VPFP. If the current node is the EgressPE of the VPFP, as an embodiment, the current resource allocation result may be recorded. The current resource allocation result corresponds to the above current resource demand.

In this embodiment, the current resource allocation result may include the VPFP associated with the current resource demand, the target egress interface for transmitting the DetNet flow on the head node in the VPFP, the target scheduling cycle for scheduling and transmitting the DetNet flow of the target egress interface, and the target transmission resource for scheduling and transmitting the DetNet flow in the target scheduling cycle. As an embodiment, the above current resource allocation result can be expressed as (VPFP): (target egress interface, target scheduling cycle, target transmission resource).

The target scheduling cycle is the current candidate scheduling cycle of the head node in the VPFP. The target transmission resource refers to the latest current basic transmission resource mentioned above. In this embodiment, once the target scheduling cycle of the target egress interface on the head node in the VPFP is determined, based on the scheduling cycle mapping relationship between two adjacent nodes in the VPFP (specifically, a mapping relationship between the scheduling cycle of the target egress interface on the previous hop node and the scheduling cycle of the target egress interface on the next hop node), the target scheduling cycles of the target egress interfaces on other nodes in the VPFP are determined. Correspondingly, the target transmission resources required for scheduling and transmitting the DetNet flow in the target scheduling cycles of the target egress interfaces on other nodes in the VPFP are also the above current basic transmission resources.

At block 715, if the target transmission resource in the current resource allocation result is not the initial resource demand amount d1 in block 703, block 716 is performed, and otherwise block 717 is performed.

At block 716, if a difference between d1 and the target transmission resource is greater than or equal to the above min, the difference is determined as an initial resource demand amount of a next reference scheduling cycle of the current target scheduling cycle of the target egress interface on the head node. If the difference between d1 and the target transmission resource is less than the above min, the min is determined as the initial resource demand amount of the next reference scheduling cycle of the current target scheduling cycle of the target egress interface on the head node. Afterwards, the next reference scheduling cycle is determined as the current scheduling cycle j, and return to perform block 703.

Herein, the current target scheduling cycle is a target scheduling cycle in the current resource allocation result.

As mentioned in block 716, in this embodiment, if the target transmission resource in the current resource allocation result is not the initial resource demand amount d1 in block 703, it indicates that resource allocation for the current resource demand is not completed currently. Based on this, when the difference between d1 and the target transmission resource is greater than or equal to the above min, the difference may be determined as the initial resource demand amount of the next reference scheduling cycle of the current target scheduling cycle of the target egress interface on the head node; and when the difference between d1 and the target transmission resource is less than the above min, the min may be determined as the initial resource demand amount of the next reference scheduling cycle of the current target scheduling cycle of the target egress interface on the head node, so as to satisfy the requirements of the min in the current resource demand. Next, the next reference scheduling cycle of the current target scheduling cycle of the target egress interface on the head node is taken as the current scheduling cycle j, and return to perform block 703. Finally, all resource allocation results satisfying the current resource demand can be obtained. As an embodiment, all resource allocation results satisfying the current resource demand are recorded in the resource allocation result list, the structure of which is {Result1, Result2, . . . }.

At block 717, if the current resource demand is the last resource demand in the resource demand list, it indicates that all resource demands have been satisfied. The resource allocation for the DetNet flow is ended. If the current resource demand is not the last resource demand in the resource demand list, a next resource demand of the current resource demand in the resource demand list is determined as the current resource demand and return to perform block 702.

The block 717 is performed under the precondition that the target transmission resource in the current resource allocation result is the initial resource demand amount d1 in the block 703, where the precondition means resource allocation has been completed for the current resource demand.

At block 718, the target transmission resource allocated to the DetNet flow is released.

Applied to the above resource allocation result list, specifically, the target transmission resource in each resource allocation result corresponding to the current resource demand is released in block 718 to ensure the utilization rate of the transmission resources.

Till now, the flow shown in FIG. 7 is completed.

Through the flow shown in FIG. 7, it is achieved that the target scheduling cycle of the target egress interface on each node in the VPFP is determined in the non-specified scheduling cycle scenario.

As an embodiment, based on the flow shown in FIG. 7, in the non-specified scheduling cycle scenario, one DetNet flow may be scheduled and transmitted in one scheduling cycle of the target egress interface on the head node in the associated VPFP. For example, the resource demand of the flow1 is (VPFP1):(intf0, InvalidCycle, 10, 2), and the corresponding resource allocation result may be (VPFP1): (intf0, Cycle0, 10), which indicates the flow1 is scheduled in one scheduling cycle Cycle0 of the target egress interface intf0 on the head node in the VPFP1, and based on the mapping relationship between the scheduling cycle of the target egress interface on the previous hop node in the VPFP and the scheduling cycle of the target egress interface on the next hop node, the target scheduling cycles of the target egress interfaces on other nodes in the VPFP are determined. The target transmission resource required for scheduling and transmitting the DetNet flow in the target scheduling cycle of the target egress interface on each node in the VPFP1 is 10 measurement units. In this way, scheduling and transmission of the flow1 on each node in the VPFP1 can be planned.

As another embodiment, based on the flow shown in FIG. 7, in the non-specified scheduling cycle scenario, one Det- Net flow may be scheduled and transmitted in at least two scheduling cycles of the target egress interface on the head node in the associated VPFP. For example, the current resource demand of the flow1 is (VPFP1):(intf0, Invalid-Cycle, 10, 2), and the corresponding resource allocation result may be (VPFP1):(intf0, Cycle0, 5), and (VPFP1): (intf0, Cycle1, 5), which indicates: the flow1 is scheduled in one scheduling cycle Cycle0 of the target egress interface intf0 on the head node in the VPFP1, and based on the mapping relationship between the scheduling cycle of the target egress interface on the previous hop node in the VPFP and the scheduling cycle of the target egress interface on the next hop node, the target scheduling cycles of the target egress interfaces on other nodes in the VPFP is determined; where the target transmission resource required for scheduling and transmitting the DetNet flow in the target scheduling cycle of the target egress interface on each node in the VPFP1 is 5 measurement units; and, the flow1 is scheduled in another scheduling cycle Cycle1 of the target egress interface intf0 on the head node in the VPFP1, and based on the mapping relationship between the scheduling cycle of the target egress interface on the previous hop node in the VPFP and the scheduling cycle of the target egress interface on the next hop node, the target scheduling cycles of the target egress interfaces on other nodes in the VPFP are determined, where the target transmission resource for scheduling and transmitting the DetNet flow in the target scheduling cycle of the target egress interface on each node in the VPFP1 is 5 measurement units. Finally, the flow1 is scheduled by using two scheduling cycles Cycle0 and Cycle1 of the target egress interface intf0 on the head node in the VPFP1, so as to plan the scheduling and transmission of the flow1 on each node in the VPFP1.

Figure 8:
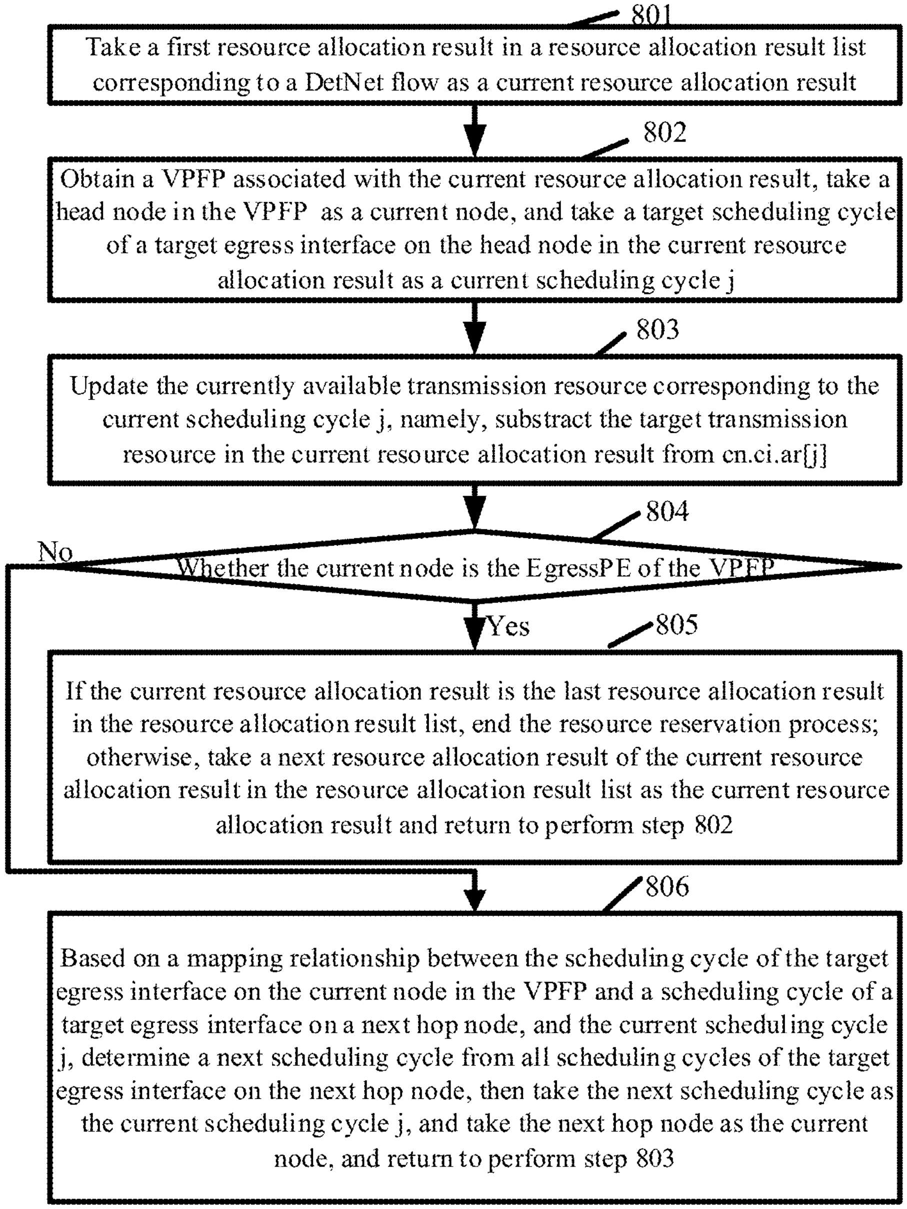
FIG. 8 is a flowchart of resource reservation according to an embodiment of the present disclosure.

In this embodiment, based on the above resource allocation result, resource reservation corresponding to the DetNet flow may be performed in the flow shown in FIG. 8.

FIG. 8 is a flowchart illustrating resource reservation provided by an embodiment of the present disclosure. As shown in FIG. 8, the flow may include the following blocks.

At block 801, a first resource allocation result in a resource allocation result list corresponding to a DetNet flow is taken as a current resource allocation result.

This embodiment is performed by starting from the first resource allocation result, or in another order, which is not limited herein.

At block 802, a VPFP associated with the current resource allocation result is obtained, a head node in the VPFP is taken as a current node, and a target scheduling cycle of a target egress interface on the head node in the current resource allocation result is taken as a current scheduling cycle j.

Herein, if the current resource allocation result is (VPFP1):(intf0, Cycle0, 10), the VPFP associated with the current resource allocation result is the VPFP1, the target egress interface on the head node in the current resource allocation result is intf0, and the target scheduling cycle of the target egress interface on the head node in the current resource allocation result is Cycle0.

At block 803, the currently available transmission resource corresponding to the current scheduling cycle j is updated, namely, the target transmission resource in the current resource allocation result is subtracted from cn.ci.ar [j].

Herein, cn.ci.ar[j] represents the currently available transmission resource (measured in the above measurement unit) corresponding to the current scheduling cycle j of the target egress interface on the current node. For example, if the current resource allocation result is (VPFP1):(intf0, Cycle0, 10), the target transmission resource is 10 measurement units. Hence, in this block 803, updating the currently available transmission resource corresponding to the current scheduling cycle j may be: subtracting the 10 measurement units from cn.ci.ar[j], so as to complete the update of the currently available transmission resource corresponding to the current scheduling cycle j.

At block 804, if the current node is the EgressPE of the VPFP, block 805 is performed and otherwise, block 806 is performed.

If the current node is the EgressPE of the VPFP, it indicates that resource reservation on the entire VPFP path is completed for the DetNet flow and then block 805 is performed.

At block 805, if the current resource allocation result is the last resource allocation result in the resource allocation result list, the resource reservation process is ended; otherwise, a next resource allocation result of the current resource allocation result in the resource allocation result list is taken as the current resource allocation result and return to perform block 802.

In this embodiment, if the current resource allocation result is the last resource allocation result in the resource allocation result list, it indicates that resource reservation has been completed for all resource allocation results and the resource reservation result (i.e., the above resource allocation result list) may be stored in a database with a successful resource reservation prompt returned. Herein, storing the resource reservation result (i.e., the above resource allocation result list) in the database aims to perform subsequent resource reclaim.

At block 806, based on a mapping relationship between the scheduling cycle of the target egress interface on the current node in the VPFP and a scheduling cycle of a target egress interface on a next hop node, and the current scheduling cycle j, a next scheduling cycle is determined from all scheduling cycles of the target egress interface on the next hop node, the next scheduling cycle is then taken as the current scheduling cycle j, and the next hop node is taken as the current node, and return to perform block 803.

Till now, the flow shown in FIG. 8 is completed.

Thus, through the flow shown in FIG. 8, it is achieved that the corresponding target transmission resource in the target scheduling cycle of the target egress interface on each node in the VPFP is reserved for the DetNet flow.

Reserving, for the DetNet flow, the corresponding target transmission resource in the target scheduling cycle of the target egress interface on each node in the VPFP is equivalent to planning at least one VPFC for transmitting the DetNet flow in a DetNet domain. In the VPFC, a data packet sent in the target scheduling cycle of the target egress interface on an upstream node is scheduled and forwarded in the target scheduling cycle of the target egress interface on a downstream node.

Figure 9:
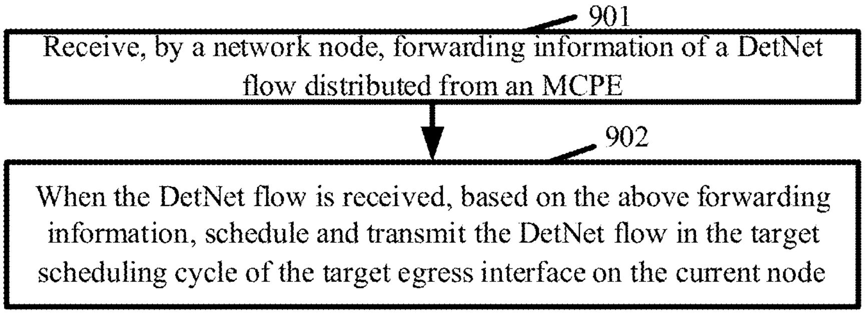
FIG. 9 is a flowchart of resource distribution according to an embodiment of the present disclosure.

In this embodiment, it is also required to distribute the above resource reservation result to a network node in the VPFP based on the flow shown in FIG. 9.

Referring to FIG. 9, FIG. 9 is a flowchart illustrating resource distribution provided by an embodiment of the present disclosure. The flow may be applied to a network node. As shown in FIG. 9, the flow may include the following blocks.

At block 901, a network node receives forwarding information of a DetNet flow distributed from an MCPE.

In this embodiment, the forwarding information at least includes VPFP configuration information and VPFC configuration information.

As an embodiment, the VPFP configuration information at least includes a VPFP identifier for representing the VPFP of the DetNet flow. The VPFP is as mentioned above and will not be repeated herein.

As an embodiment, the VPFC configuration information at least includes: a target scheduling cycle for transmitting the DetNet flow of a target egress interface on the current node, and a target transmission resource for transmitting the DetNet flow in the target scheduling cycle. Optionally, the VPFC configuration information may further include an identifier of the VPFP carrying the VPFC. A same VPFP may carry multiple VPFCs, which is not limited herein.

In a stack mode scenario, the forwarding information of a DetNet flow is generally distributed only to a head node in the VPFP in the stack mode scenario. Hence, correspondingly, the above network node may be the head node in the VPFP. In this case, as an embodiment, the VPFP configuration information further includes: a scheduling cycle pipe corresponding to each scheduling cycle of the target egress interface on the head node, where the number of the scheduling cycle pipes is equal to the number of the scheduling cycles configured for the target egress interface on the head node. For example, the target egress interface on the head node is configured with n scheduling cycles, and thus, the VPFP configuration information includes n scheduling cycle pipes.

As an embodiment, each scheduling cycle pipe is formed by starting with one scheduling cycle of the target egress interface on the head node and each scheduling cycle sequentially determined based on a scheduling cycle mapping relationship between upstream and downstream nodes in the VPFP. The scheduling cycle mapping relationship is a mapping relationship between a scheduling cycle of a target egress interface on an upstream node and a scheduling cycle of a target egress interface on a downstream node in the VPFP. For example, if the VPFP is (PE1, Intf0) f1 (P1, Intf3) f2 (P3, Intf3) f3 (P4, Intf2), one of the scheduling cycle pipes is (PE1, Intf0, cycle0)->(P1, Intf3, f1 (cycle0))->(P3, Intf3, f2 (f1 (cycle0)))->(P4, Intf2, f3(f2(f1(cycle0)))). Herein, cycle0 is one scheduling cycle of the target egress interface Intf0 on the head node PE1 in the VPFP, and f1 (cycle0) is one scheduling cycle of the target egress interface Intf3 on a next hop node of the PE1 in the VPFP which is determined based on the scheduling cycle mapping relationship between PE1 and P1, and the scheduling cycle cycle0 of the target egress interface Intf0 on the PE1; f2 (f1 (cycle0)) is one scheduling cycle of the target egress interface Intf3 on the next hop node of P1, i.e. P3, in the VPFP, and is determined based on the scheduling cycle mapping relationship between P1 and P3, and the scheduling cycle f1 (cycle0) of the target egress interface Intf3 on P1; f3(f2(f1 (cycle0))) is one scheduling cycle of the target egress interface Intf2 on the next hop node of P3, i.e. P4, in the VPFP, and is determined based on the scheduling cycle mapping relationship between the previous hop node P3 and P4, and the scheduling cycle f2(f1(cycle0)) of the target egress interface Intf3 on P3.

In the above stack mode scenario, the above VPFC configuration information is exemplified as follows:

```
  +-- uint16 vpfcid                              #virtual periodic forwarding channel identifier;
  +-- uint16 vpfpid                                 # virtual periodic forwarding path identifier for
identifying the corresponding VPFP;
  +-- if_config[oif]                           #target egress interface on the head node, Outgoing
InterFace;
  +-- uint16 cycles                          #cycle number involved in the resources allocated for
VPFC;
     +-- uint8   cycleinfo[0..cycles-1]                  #cycles involved in the allocated
resources and corresponding resources
  +--uint16 cycleid                        #Cycle ID
        +--uint16 res                      #the target transmission resource used for scheduling and
transmission in the target scheduling cycle of the target egress interface on the head node.
```

In the above stack mode scenario, the above VPFP configuration information is exemplified as follows:

```
  +-- uint16 vpfpid                          # virtual periodic forwarding path identifier;
  +-- uint8   cycles                            # scheduling cycle number, same value used in
CSQF/TCQF domain;
  +-- policy_info [policy]            # SRv6 Policy information;
  +-- pipe_info[0..cycles-1]             #the scheduling cycle pipe corresponding to each
scheduling cycle of the head node;
  +-- uint8 hops                  # Number of hops
  +-- map_info[0..hops-1]          #the scheduling cycle in each scheduling cycle pipe;
     +--uint8 out_cycle                         #output cycle;
```

The above descriptions are made with an application in the stack mode scenario as an example. In the stack mode scenario, when transmitting the DetNet flow, the head node may, based on the scheduling cycle for currently scheduling and transmitting the DetNet flow, determine the corresponding scheduling cycle pipe, and carry the scheduling cycle pipe in the DetNet flow for transmission. For example, when PE1, as the head node, currently schedules and transmits the DetNet flow in the scheduling cycle cycle0 of the target egress interface Intf0, the above scheduling cycle pipe carried in the DetNet flow may be: (PE1, Intf0, cycle0)->(P1, Intf3, f1 (cycle0))->(P3, Intf3, f2 (f1 (cycle0)))->(P4, Intf2, f3 (f2 (f1 (cycle0)))). In this way, other nodes in the VPFP may, based on the above scheduling cycle pipe carried in the DetNet flow, determine the scheduling cycle for scheduling the DetNet flow of the current node, and based on the determined scheduling cycle, perform scheduling and transmission on the DetNet flow.

Of course, in a swap mode scenario, the above network node may be any node in the VPFP, for example, a head node, a middle node P and a tail node. Different from the scheduling cycle pipe involved in the above stack mode, in this embodiment, the VPFC configuration information of other nodes than the tail node in the VPFP may further include the target scheduling cycle for scheduling and transmitting the DetNet flow of the target egress interface on a next hop node, so as to achieve the forwarding of the DetNet flow. For example, PE1, as the head node, schedules and transmits the DetNet flow in the scheduling cycle cycle0 of the target egress interface Intf0, and based on the configured VPFC configuration information, determines the next hop node P1 schedules and transmits the DetNet flow in the scheduling cycle f1 (cycle0) of the target egress interface Intf3, and then, the scheduling cycle f1 (cycle0) of the target egress interface Intf3 on P1 is carried in the DetNet flow for forwarding. After receiving the DetNet flow, the P1 determines to schedule the DetNet flow in the scheduling cycle f1 (cycle0) of the target egress interface Intf3, and based on the configured VPFC configuration information, determines the next hop node P3 schedules and transmits the DetNet flow in the scheduling cycle f3 (f2(f1(cycle0))) of the target egress interface Intf3, and then, the scheduling cycle f3 (f2(f1(cycle0))) of the target egress interface Intf3 on P3 may be carried in the DetNet flow for forwarding, and so on. Finally, other nodes in the VPFP complete the scheduling and transmission of the DetNet flow.

At block 902, when the DetNet flow is received, based on the above forwarding information, the DetNet flow is scheduled and transmitted in the target scheduling cycle of the target egress interface on the current node.

Based on the above descriptions of resource reservation, it can be known that before block 902, a target transmission resource for scheduling and transmitting the DetNet flow and corresponding to the DetNet flow in the target scheduling cycle of the target egress interface on each node in the VPFP is reserved. Therefore, applied in this block 902, the DetNet flow can be scheduled and transmitted on the head node in VPFP by directly using the target transmission resource reserved previously for the DetNet flow in the target scheduling cycle of the target egress interface. After receiving the DetNet flow, other nodes in the VPFP also can schedule and transmit the DetNet flow by using the target transmission resource reserved previously for the DetNet flow in the target scheduling cycle of the target egress interface. Thus, scheduling and transmission of the entire DetNet flow is achieved finally.

Till now, the flow shown in FIG. 9 is completed.

Resource distribution is accomplished in the flow shown in FIG. 9.

Above descriptions are made to the method provided by the embodiments of the present disclosure. An apparatus provided by the embodiments of the present disclosure will be described below.

Figure 10:
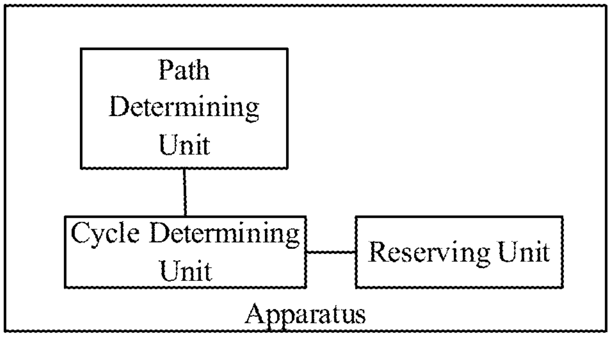
FIG. 10 is a structural diagram illustrating an apparatus according to an embodiment of the present disclosure.

Referring to FIG. 10, FIG. 10 is a structural schematic diagram illustrating an apparatus according to an embodiment of the present disclosure. The apparatus is applied to a management/control plane entity (MCPE). As shown in FIG. 10, the apparatus includes:

a path determining unit, configured to determine a virtual periodic forwarding path (VPFP) of a DetNet flow; wherein there is a scheduling cycle mapping relationship between any node other than a tail node in the VPFP and a next hop node of the any node; the scheduling cycle mapping relationship refers to a mapping relationship between a scheduling cycle of a target egress interface for transmitting the DetNet flow on any node other than the tail node in the VPFP and a scheduling cycle of a target egress interface for transmitting the DetNet flow on a next hop node of the any node;

a cycle determining unit, configured to, for the target egress interface on each node in the VPFP, plan a target scheduling cycle for scheduling and transmitting the DetNet flow; wherein the target scheduling cycle of the target egress interface on any node other than the head node in the VPFP is determined based on the scheduling cycle mapping relationship between a previous hop node of the any node and the any node and the target scheduling cycle of the target egress interface on the previous hop node;

a reserving unit, configured to, from an available transmission resource corresponding to the target scheduling cycle of the target egress interface on each node in the VPFP, reserve a target transmission resource for transmitting the DetNet flow within the target scheduling cycle so as to transmit the DetNet flow by the target transmission resource allocated for the target scheduling cycle of the target egress interface on each node in the VPFP.

As an embodiment, for the target egress interface on each node in the VPFP, planning the target scheduling cycle for scheduling and transmitting the DetNet flow includes:

obtaining one or more reference scheduling cycles for scheduling the DetNet flow of the target egress interface on the head node;

for each of the reference scheduling cycles of the target egress interface on the head node, starting following cycle determining process:

determining whether a currently available transmission resource corresponding to a current scheduling cycle of a target egress interface on a current node is greater than or equal to a specified transmission resource S1; wherein S1 represents a transmission resource required for transmitting the DetNet flow in the reference scheduling cycle; if the currently available transmission resource corresponding to the current scheduling cycle is greater than or equal to S1, determining the current scheduling cycle as a candidate scheduling cycle of the target egress interface on the current node;

if the current node is not the tail node, based on the current scheduling cycle and the scheduling cycle mapping relationship between the current node and a next hop node of the current node, determining a next scheduling cycle of the next hop node; determining the next scheduling cycle as the current scheduling cycle and the next hop node as the current node, and returning to the block of determining whether the currently available transmission resource corresponding to the current scheduling cycle of the target egress interface on the current node is greater than or equal to S1;

if the current node is the tail node, determining the determined candidate scheduling cycle of the target egress interface on each node in the VPFP as the target scheduling cycle for scheduling and transmitting the DetNet flow.

As an embodiment, the VPFP is determined based on a VPFP identifier in one resource demand corresponding to the DetNet flow;

the resource demand indicates a specified scheduling cycle for scheduling and transmitting the DetNet flow of the target egress interface on the head node, and a resource demand number corresponding to the specified scheduling cycle; the specified scheduling cycle is the reference scheduling cycle and the resource demand number corresponding to the specified scheduling cycle is represented by the specified transmission resource S1.

As an embodiment, the cycle determining unit is configured to, after, for the target egress interface on each node in the VPFP, planning the target scheduling cycle for scheduling and transmitting the DetNet flow, record a resource allocation result;

wherein the resource allocation result comprises: the VPFP, the target egress interface for transmitting the DetNet flow on the head node, the target scheduling cycle for scheduling and transmitting the DetNet flow of the target egress interface on the head node, and the target transmission resource used for scheduling and transmitting the DetNet flow within the target scheduling cycle; the target transmission resource is S1.

As an embodiment, for the target egress interface on each node in the VPFP, planning the target scheduling cycle for scheduling and transmitting the DetNet flow includes:

for a reference scheduling cycle for scheduling the DetNet flow of the target egress interface on the head node, executing following cycle determining process:

determining the reference scheduling cycle as a current candidate scheduling cycle of the target egress interface on the head node, and determining whether a currently available transmission resource corresponding to the reference scheduling cycle is greater than or equal to an initial resource demand amount required for scheduling and transmitting the DetNet flow in the reference scheduling cycle; wherein if the reference scheduling cycle is a first scheduling cycle, for which the cycle determining process is performed, of the target egress interface on the head node, the initial resource demand amount is a specified transmission resource S2 specified for scheduling and transmitting the DetNet flow, and otherwise, the initial resource demand amount is determined based on S2 and d0; S2 represents a transmission resource required for scheduling and transmitting the DetNet flow, d0 represents a sum of target transmission resources required for transmitting the DetNet flow in each determined target scheduling cycle of the target egress interface on the head node;

if the currently available transmission resource corresponding to the reference scheduling cycle is greater than or equal to the initial resource demand amount, determining a current basic transmission resource as the initial resource demand amount, and performing block a;

if the currently available transmission resource corresponding to the reference scheduling cycle is not greater than or equal to the initial resource demand amount, determining the current basic transmission resource as a reference resource demand amount which is less than the initial resource demand amount, and performing block a;

wherein the block a comprises: based on the current scheduling cycle and the scheduling cycle mapping relationship between the current node and the next hop node, determining the next scheduling cycle of the next hop node as the current scheduling cycle and the next hop node as the current node; determining whether a currently available transmission resource corresponding to the current scheduling cycle is greater than or equal to the current basic transmission resource; if yes, determining the current scheduling cycle as a candidate scheduling cycle of the target egress interface on the current node; if the current node is not the tail node, returning to the block of determining the next scheduling cycle; if the current node is the tail node, determining the candidate scheduling cycle, determined by this process, of the target egress interface on each node in the VPFP as the target scheduling cycle for scheduling and transmitting the DetNet flow.

As an embodiment, if the currently available transmission resource corresponding to the current scheduling cycle is less than the current basic transmission resource in block a, the cycle determining unit is further configured to: check whether the currently available transmission resource corresponding to the current scheduling cycle satisfies preset resource update conditions; if yes, update the current basic transmission resource, wherein the updated current basic transmission resource is less than the current basic transmission resource before the updating, and then return to the block of determining whether the currently available transmission resource corresponding to the current scheduling cycle is greater than or equal to the current basic transmission resource.

As an embodiment, checking whether the currently available transmission resource corresponding to the current scheduling cycle satisfies preset resource update conditions comprises: calculating $\lfloor cn.ci.ar[j]/min \rfloor$ to obtain a calculation result k1; if k1 is greater than 0, determining the currently available transmission resource corresponding to the current scheduling cycle satisfies the preset resource update conditions, and otherwise, determining the currently available transmission resource corresponding to the current scheduling cycle does not satisfy the preset resource update conditions; wherein cn.ci.ar[j] represents the currently available transmission resource corresponding to the current scheduling cycle, and min represents a minimum transmission resource configured for transmitting the DetNet flow within one scheduling cycle, and $\lfloor\ \rfloor$ refers to rounding;

the updated current basic transmission resource is a product of k1 and min.

As an embodiment, the reference resource demand amount is represented by a product of k2 and min; wherein $k2=\lfloor cn.ci.ar[c]/min \rfloor$; cn.ci.ar[c] represents the currently available transmission resource corresponding to the reference scheduling cycle, and min represents a minimum transmission resource configured for transmitting the DetNet flow within one scheduling cycle, and $\lfloor\ \rfloor$ represents rounding.

As an embodiment, the VPFP is determined based on a VPFP identifier in one resource demand corresponding to the DetNet flow;

the reference scheduling cycle comprises a scheduling cycle, satisfying following conditions, of the target egress interface on the head node: an available transmission resource corresponding to this scheduling cycle is greater than or equal to min; wherein min represents a minimum transmission resource configured for transmitting the DetNet flow within one scheduling cycle.

As an embodiment, the cycle determining unit is configured to, after, for the target egress interface on each node in the VPFP, planning the target scheduling cycle for scheduling and transmitting the DetNet flow, record a resource allocation result;

wherein the resource allocation result comprises: the VPFP, the target egress interface for transmitting the DetNet flow on the head node, the target scheduling cycle for scheduling and transmitting the DetNet flow of the target egress interface on the head node, and the target transmission resource used for scheduling and transmitting the DetNet flow within the target scheduling cycle; the target transmission resource is the current basic transmission resource.

As an embodiment, the scheduling cycle mapping relationship is represented by an injective function to indicate that any scheduling cycle of a target egress interface on one node other than the tail node in the VPFP is mapped to a unique scheduling cycle of a target egress interface on a next hop node of the one node.

As an embodiment, each node in the VPFP is configured with n equal-length scheduling cycles, wherein n is greater than 1.

Till now, the descriptions on the structure of the apparatus shown in FIG. 10 are completed.

Figure 11:
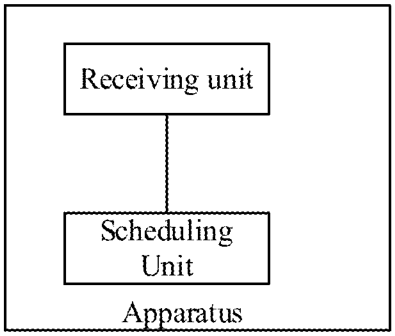
FIG. 11 is a structural diagram illustrating another apparatus according to an embodiment of the present disclosure.

FIG. 11 is a structural diagram illustrating another apparatus according to an embodiment of the present disclosure. The apparatus is applied to a network node. The apparatus includes:

a receiving unit, configured to receive forwarding information of a DetNet flow to be transmitted which is distributed from a management/control plane entity (MCPE); wherein the forwarding information at least comprises: configuration information of a virtual periodic forwarding path (VPFP) and configuration information of a virtual periodic forwarding channel (VPFC); the configuration information of the VPFP at least comprises a VPFP identifier; the VPFP identifier is used to represent the VPFP of the DetNet flow, and there is a scheduling cycle mapping relationship between any node other than a tail node in the VPFP and a next hop node of the any node; the scheduling cycle mapping relationship refers to a mapping relationship between a scheduling cycle configured for a target egress interface for transmitting the DetNet flow on the any node other than the tail node in the VPFP and a scheduling cycle configured for a target egress interface for transmitting the DetNet flow on the next hop node; the configuration information of the VPFC at least comprises: a target scheduling cycle for scheduling and transmitting the DetNet flow of the target egress interface on the current node, and a target transmission resource allocated for the target scheduling cycle to transmit the DetNet flow;

a scheduling unit, configured to, when receiving the DetNet flow, based on the forwarding information, schedule and transmit the DetNet flow in the target scheduling cycle for scheduling and transmitting the DetNet flow of the target egress interface on the current node.

As an embodiment, the network node is ahead node in the VPFP;

the configuration information of the VPFP further comprises a scheduling cycle pipe corresponding to each scheduling cycle of the target egress interface on the head node; a number of the scheduling cycle pipes is equal to a number of the scheduling cycles configured for the target egress interface on the head node;

each scheduling cycle pipe is formed by starting with one scheduling cycle of the target egress interface on the head node and each scheduling cycle determined sequentially based on a scheduling cycle mapping relationship between upstream and downstream nodes in the VPFP; the scheduling cycle mapping relationship is a mapping relationship between a scheduling cycle of a target egress interface on an upstream node in the VPFP and a scheduling cycle of a target egress interface on a downstream node of the upstream node.

Till now, the descriptions on the structure of the apparatus shown in FIG. 11 are completed.

Figure 12:
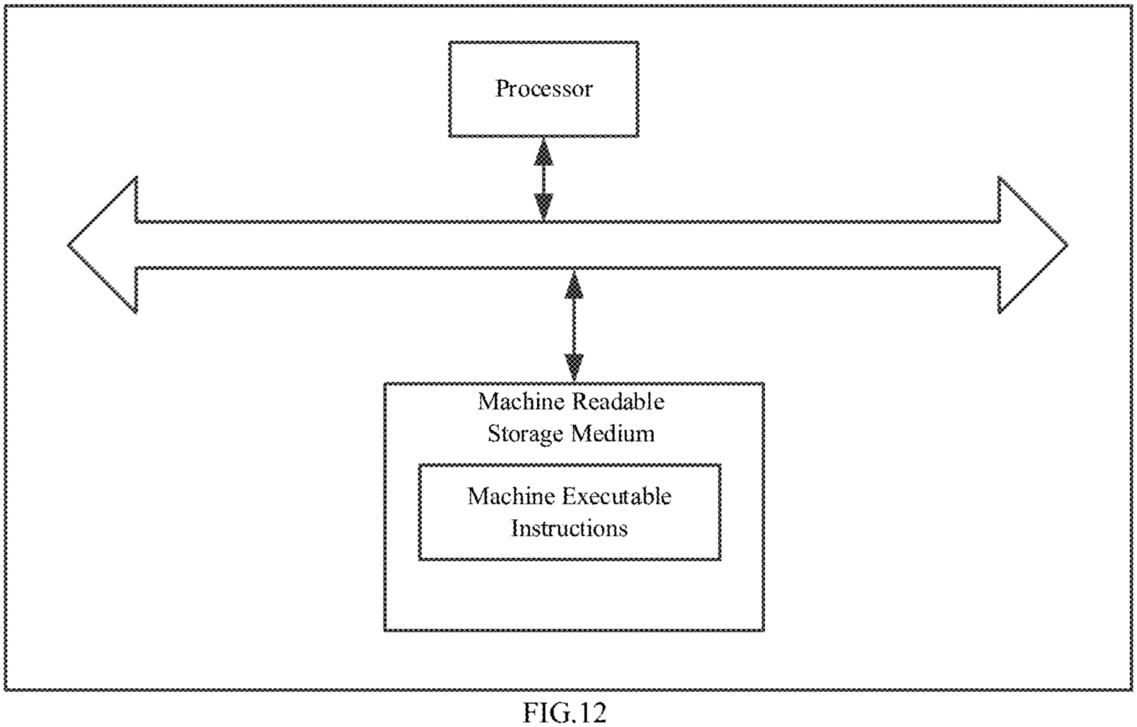
FIG. 12 is a structural diagram illustrating an electronic device according to an embodiment of the present disclosure.

An embodiment of the present disclosure provides a hardware structure of the apparatus of FIG. 10 or 11. FIG. 12 is a structural diagram illustrating an electronic device according to an embodiment of the present disclosure. As shown in FIG. 12, the hardware structure may include a processor and a machine readable storage medium, wherein the machine readable storage medium stores machine executable instructions executable by the processor; and the processor is configured to execute the machine executable instructions to perform the methods provided by the above embodiments.

Based on the same application idea as the above methods, an embodiment of the present disclosure further provides a machine readable storage medium, storing several computer instructions, where the computer instructions are executed by a processor to perform the methods in the above embodiments of the present disclosure.

Illustratively, the machine readable storage medium mentioned herein may be any of electronic storage devices, magnetic storage devices, optical storage devices or other physical storage devices and may contain or store information such as executable instructions, data and so on. For example, the machine readable storage medium may be a Radom Access Memory (RAM), a volatile memory, a non-volatile memory, a flash memory, a storage drive (e.g. hard disk drive), a solid state disk, any type of storage disk (e.g., compact disk, Digital Video Disk (DVD)), or a similar storage medium, or a combination thereof.

The systems, apparatuses, modules or units described in the above examples may be specifically implemented by a computer chip or an entity or may be implemented by a product with a particular function. A typical implementing device is a computer and the computer may be specifically a personal computer, a laptop computer, a cellular phone, a camera phone, a smart phone, a personal digital assistant, a media player, a navigation device, an email transceiver, a game console, a tablet computer, a wearable device, or a combination of any several devices of the above devices.

For ease of descriptions, the above apparatus is divided into different units based on functionality for descriptions. Of course, the functions of different units may be implemented in a same or a plurality of hardware and/or software when practicing the present disclosure.

The persons skilled in the art should understand that the examples of the present disclosure may be provided as a method, a system, or a computer program product. Thus, entire hardware examples, entire software examples or examples combining software and hardware may be adopted in the present disclosure. Further, the present disclosure may be implemented in the form of a computer program product that is operated on one or more computer available storage media (including but not limited to magnetic disk memory, CD-ROM, and optical memory and so on) including computer available program codes.

The present disclosure is described by referring to flowcharts and/or block diagrams of a method, a device (a system) and a computer program product in the examples of the present disclosure. It is understood that each flowchart and/or block in the flowcharts and/or the block diagrams or a combination of a flow chart and/or a block of the flowcharts and/or the block diagrams may be implemented by computer program instructions. These computer program instructions may be provided to a general-purpose computer, a dedicated computer, an embedded processor, or a processor of another programmable data processing device to generate a machine so that the instructions executable by a computer or a processor of another programmable data processing device generate an apparatus for implementing functions designated in one or more flows of the flowcharts and/or one or more blocks of the block diagrams.

Further, these computer program instructions may also be stored in a computer readable memory that can direct a computer or another programmable data processing device to work in a particular manner so that the instructions stored in the computer readable memory generate a product including an instruction apparatus and the instruction apparatus can implement functions designated in one or more flows of the flowcharts and/or one or more blocks of the block diagrams.

The computer program instructions may also be loaded on a computer or another programmable data processing device, so that a series of operation blocks can be executed on the computer or another programmable device to generate processing achieved by the computer, and thus instructions executable on the computer or another programmable device are provided for blocks for realizing functions designated in one or more flows of the flowcharts and/or one or more blocks of the block diagrams.

From the above technical solutions, it can be seen that in the embodiments of the present disclosure, at least one target scheduling cycle for transmitting the DetNet flow is determined for the target egress interface on each node in the VPFP of the DetNet flow, and from the available transmission resource corresponding to the target scheduling cycle of the target egress interface on each node in the VPFP, reserve a target transmission resource allocated for transmitting the DetNet flow within the target scheduling cycle so as to transit the DetNet flow by the target transmission resource allocated for the target scheduling cycle of the target egress interface on each node in VPFP, thus avoiding scheduling and transmission conflicts among multiple DetNet flows.

The above descriptions are only some examples of the present disclosure, and are not used to limit the present disclosure. For those skilled in the art, the present disclosure may have various changes and modifications. Any modifications, equivalent replacements, improvements, etc. made in the spirit and principle of this present disclosure shall fall within the scope of claims of the present disclosure.

The invention claimed is:

1. A resource reservation method, applied to a management/control plane entity (MCPE) and comprises:

determining a virtual periodic forwarding path (VPFP) of a DetNet flow transmitted in a DetNet domain; wherein there is a pre-configured static scheduling cycle mapping relationship between any node other than a tail node in the VPFP and a next hop node of the any node; the scheduling cycle mapping relationship refers to a mapping relationship between a scheduling cycle of a target egress interface for transmitting the DetNet flow on any node other than the tail node in the VPFP and a scheduling cycle of a target egress interface for transmitting the DetNet flow on a next hop node of the any node; wherein the scheduling cycle mapping relationship is an injective function;

for the target egress interface on each node in the VPFP, planning a target scheduling cycle for scheduling and transmitting the DetNet flow; wherein the target scheduling cycle of the target egress interface on any node other than the head node in the VPFP is determined based on the scheduling cycle mapping relationship between a previous hop node of the any node and the any node and the target scheduling cycle of the target egress interface on the previous hop node;

from an available transmission resource corresponding to the target scheduling cycle of the target egress interface on each node in the VPFP, reserving a target transmission resource for transmitting the DetNet flow within the target scheduling cycle so as to transmit the DetNet flow by the target transmission resource allocated for the target scheduling cycle of the target egress interface on each node in the VPFP.

2. The method of claim 1, wherein, for the target egress interface on each node in the VPFP, planning the target scheduling cycle for scheduling and transmitting the DetNet flow comprises:

obtaining one or more reference scheduling cycles for scheduling the DetNet flow of the target egress interface on the head node;

for each of the reference scheduling cycles of the target egress interface on the head node, starting following cycle determining process:

determining whether a currently available transmission resource corresponding to a current scheduling cycle of a target egress interface on a current node is greater than or equal to a specified transmission resource S1; wherein S1 represents a transmission resource required for transmitting the DetNet flow in the reference scheduling cycle; if the currently available transmission resource corresponding to the current scheduling cycle is greater than or equal to S1, determining the current scheduling cycle as a candidate scheduling cycle of the target egress interface on the current node;

if the current node is not the tail node, based on the current scheduling cycle and the scheduling cycle mapping relationship between the current node and a next hop node of the current node, determining a next scheduling cycle of the next hop node; determining the next scheduling cycle as the current scheduling cycle and the next hop node as the current node, and returning to the block of determining whether the currently available transmission resource corresponding to the current scheduling cycle of the target egress interface on the current node is greater than or equal to S1;

if the current node is the tail node, determining the determined candidate scheduling cycle of the target egress interface on each node in the VPFP as the target scheduling cycle for scheduling and transmitting the DetNet flow.

3. The method of claim 2, wherein the VPFP is determined based on a VPFP identifier in one resource demand corresponding to the DetNet flow;

the resource demand indicates a specified scheduling cycle for scheduling and transmitting the DetNet flow of the target egress interface on the head node, and a resource demand number corresponding to the specified scheduling cycle; the specified scheduling cycle is the reference scheduling cycle and the resource demand number corresponding to the specified scheduling cycle is represented by the specified transmission resource S1.

4. The method of claim 2, wherein after, for the target egress interface on each node in the VPFP, planning the target scheduling cycle for scheduling and transmitting the DetNet flow, the method further comprises: recording a resource allocation result;

wherein the resource allocation result comprises: the VPFP, the target egress interface for transmitting the DetNet flow on the head node, the target scheduling cycle for scheduling and transmitting the DetNet flow of the target egress interface on the head node, and the target transmission resource used for scheduling and transmitting the DetNet flow within the target scheduling cycle; the target transmission resource is S1.

5. The method of claim 1, wherein, for the target egress interface on each node in the VPFP, planning the target scheduling cycle for scheduling and transmitting the DetNet flow comprises:

for a reference scheduling cycle for scheduling the DetNet flow of the target egress interface on the head node, executing following cycle determining process:

determining the reference scheduling cycle as a current candidate scheduling cycle of the target egress interface on the head node, and determining whether a currently available transmission resource corresponding to the reference scheduling cycle is greater than or equal to an initial resource demand amount required for scheduling and transmitting the DetNet flow in the reference scheduling cycle; wherein if the reference scheduling cycle is a first scheduling cycle, for which the cycle determining process is performed, of the target egress interface on the head node, the initial resource demand amount is a specified transmission resource S2 specified for scheduling and transmitting the DetNet flow, and otherwise, the initial resource demand amount is determined based on S2 and do; S2 represents a transmission resource required for scheduling and transmitting the DetNet flow, do represents a sum of target transmission resources required for transmitting the DetNet flow in each determined target scheduling cycle of the target egress interface on the head node;

if the currently available transmission resource corresponding to the reference scheduling cycle is greater than or equal to the initial resource demand amount, determining a current basic transmission resource as the initial resource demand amount, and performing block a;

if the currently available transmission resource corresponding to the reference scheduling cycle is not greater than or equal to the initial resource demand amount, determining the current basic transmission resource as a reference resource demand amount which is less than the initial resource demand amount, and performing block a;

wherein the block a comprises: based on the current scheduling cycle and the scheduling cycle mapping relationship between the current node and the next hop node, determining the next scheduling cycle of the next hop node as the current scheduling cycle and the next hop node as the current node; determining whether a currently available transmission resource corresponding to the current scheduling cycle is greater than or equal to the current basic transmission resource; if yes, determining the current scheduling cycle as a candidate scheduling cycle of the target egress interface on the current node; if the current node is not the tail node, returning to the block of determining the next scheduling cycle; if the current node is the tail node, determining the candidate scheduling cycle, determined by this process, of the target egress interface on each node in the VPFP as the target scheduling cycle for scheduling and transmitting the DetNet flow.

6. The method of claim 5, wherein, if the currently available transmission resource corresponding to the current scheduling cycle is less than the current basic transmission resource in block a, the method further comprises:

checking whether the currently available transmission resource corresponding to the current scheduling cycle satisfies preset resource update conditions; if yes, updating the current basic transmission resource, wherein the updated current basic transmission resource is less than the current basic transmission resource before the updating, and then returning to the block of determining whether the currently available transmission resource corresponding to the current scheduling cycle is greater than or equal to the current basic transmission resource.

7. The method of claim 6, wherein checking whether the currently available transmission resource corresponding to the current scheduling cycle satisfies preset resource update conditions comprises: calculating $\lfloor cn.ci.ar[j]/min \rfloor$ to obtain a calculation result k1; if k1 is greater than 0, determining the currently available transmission resource corresponding to the current scheduling cycle satisfies the preset resource update conditions, and otherwise, determining the currently available transmission resource corresponding to the current scheduling cycle does not satisfy the preset resource update conditions; wherein cn.ci.ar[j] represents the currently available transmission resource corresponding to the current scheduling cycle, and min represents a minimum transmission resource configured for transmitting the DetNet flow within one scheduling cycle, and $\lfloor\ \rfloor$ refers to rounding;

the updated current basic transmission resource is a product of k1 and min.

8. The method of claim 5, wherein, the reference resource demand amount is represented by a product of k2 and min; wherein $k2=\lfloor cn.ci.ar[c]/min \rfloor$; cn.ci.ar[c] represents the currently available transmission resource corresponding to the reference scheduling cycle, and min represents a minimum transmission resource configured for transmitting the DetNet flow within one scheduling cycle, and $\lfloor\ \rfloor$ represents rounding.

9. The method of claim 5, wherein the VPFP is determined based on a VPFP identifier in one resource demand corresponding to the DetNet flow;

the reference scheduling cycle comprises a scheduling cycle, satisfying following conditions, of the target egress interface on the head node: an available transmission resource corresponding to this scheduling cycle is greater than or equal to min; wherein min represents a minimum transmission resource configured for transmitting the DetNet flow within one scheduling cycle.

10. The method of claim 5, wherein after, for the target egress interface on each node in the VPFP, planning the target scheduling cycle for scheduling and transmitting the DetNet flow, the method further comprises: recording a resource allocation result;

wherein the resource allocation result comprises: the VPFP, the target egress interface for transmitting the DetNet flow on the head node, the target scheduling cycle for scheduling and transmitting the DetNet flow of the target egress interface on the head node, and the target transmission resource used for scheduling and transmitting the DetNet flow within the target scheduling cycle; the target transmission resource is the current basic transmission resource.

11. The method of claim 1, wherein the scheduling cycle mapping relationship is represented by an injective function to indicate that any scheduling cycle of a target egress interface on one node other than the tail node in the VPFP is mapped to a unique scheduling cycle of a target egress interface on a next hop node of the one node.

12. The method of claim 1, wherein each node in the VPFP is configured with n equal-length scheduling cycles, wherein n is greater than 1.

13. A resource distribution method, applied to a network node and comprises:

receiving forwarding information of a DetNet flow to be transmitted which is distributed from a management/control plane entity (MCPE), wherein the forwarding information is determined by the MCPE referencing the resource reservation method according to claim 1;

wherein the forwarding information at least comprises: configuration information of a virtual periodic forwarding path (VPFP) and configuration information of a virtual periodic forwarding channel (VPFC); the configuration information of the VPFP at least comprises a VPFP identifier;

the VPFP identifier is used to represent the VPFP of the DetNet flow, and there is a scheduling cycle mapping relationship between any node other than a tail node in the VPFP and a next hop node of the any node; the scheduling cycle mapping relationship refers to a mapping relationship between a scheduling cycle configured for a target egress interface for transmitting the DetNet flow on the any node other than the tail node in the VPFP and a scheduling cycle configured for a target egress interface for transmitting the DetNet flow on the next hop node; the configuration information of the VPFC at least comprises: a target scheduling cycle for scheduling and transmitting the DetNet flow of the target egress interface on the current node, and a target transmission resource allocated for the target scheduling cycle to transmit the DetNet flow;

when the DetNet flow is received, based on the forwarding information, scheduling and transmitting the DetNet flow in the target scheduling cycle for scheduling and transmitting the DetNet flow of the target egress interface on the current node.

14. The method of claim 13, wherein the network node is a head node in the VPFP;

the configuration information of the VPFP further comprises a scheduling cycle pipe corresponding to each scheduling cycle of the target egress interface on the head node; a number of the scheduling cycle pipes is equal to a number of the scheduling cycles configured for the target egress interface on the head node;

each scheduling cycle pipe is formed by starting with one scheduling cycle of the target egress interface on the head node and each scheduling cycle determined sequentially based on a scheduling cycle mapping relationship between upstream and downstream nodes in the VPFP; the scheduling cycle mapping relationship is a mapping relationship between a scheduling cycle of a target egress interface on an upstream node in the VPFP and a scheduling cycle of a target egress interface on a downstream node of the upstream node.

15. An electronic device, comprises: a processor and a machine readable storage medium; wherein, the machine readable storage medium stores machine executable instructions executed by the processor;

the processor is configured to execute the machine executable instructions to perform the operations comprising:

determining a virtual periodic forwarding path (VPFP) of a DetNet flow transmitted in a DetNet domain; wherein there is a pre-configured static scheduling cycle mapping relationship between any node other than a tail node in the VPFP and a next hop node of the any node; the scheduling cycle mapping relationship refers to a mapping relationship between a scheduling cycle of a target egress interface for transmitting the DetNet flow on any node other than the tail node in the VPFP and a scheduling cycle of a target egress interface for transmitting the DetNet flow on a next hop node of the any node; wherein the scheduling cycle mapping relationship is an injective function;

for the target egress interface on each node in the VPFP, planning a target scheduling cycle for scheduling and transmitting the DetNet flow; wherein the target scheduling cycle of the target egress interface on any node other than the head node in the VPFP is determined based on the scheduling cycle mapping relationship between a previous hop node of the any node and the any node and the target scheduling cycle of the target egress interface on the previous hop node;

from an available transmission resource corresponding to the target scheduling cycle of the target egress interface on each node in the VPFP, reserving a target transmission resource for transmitting the DetNet flow within the target scheduling cycle so as to transmit the DetNet flow by the target transmission resource allocated for the target scheduling cycle of the target egress interface on each node in the VPFP.

16. A non-transitory machine readable storage medium, storing machine executable instructions executed by a processor; wherein, the machine readable instructions are executed by the processor to perform the method of claim 1.

17. The electronic device of claim 13, wherein for the target egress interface on each node in the VPFP, planning the target scheduling cycle for scheduling and transmitting the DetNet flow comprises:

obtaining one or more reference scheduling cycles for scheduling the DetNet flow of the target egress interface on the head node;

for each of the reference scheduling cycles of the target egress interface on the head node, starting following cycle determining process:

determining whether a currently available transmission resource corresponding to a current scheduling cycle of a target egress interface on a current node is greater than or equal to a specified transmission resource S1; wherein S1 represents a transmission resource required for transmitting the DetNet flow in the reference scheduling cycle; if the currently available transmission resource corresponding to the current scheduling cycle is greater than or equal to S1, determining the current scheduling cycle as a candidate scheduling cycle of the target egress interface on the current node;

if the current node is not the tail node, based on the current scheduling cycle and the scheduling cycle mapping relationship between the current node and a next hop node of the current node, determining a next scheduling cycle of the next hop node; determining the next scheduling cycle as the current scheduling cycle and the next hop node as the current node, and returning to the block of determining whether the currently available transmission resource corresponding to the current scheduling cycle of the target egress interface on the current node is greater than or equal to S1;

if the current node is the tail node, determining the determined candidate scheduling cycle of the target egress interface on each node in the VPFP as the target scheduling cycle for scheduling and transmitting the DetNet flow.

18. The electronic device of claim 17, wherein the VPFP is determined based on a VPFP identifier in one resource demand corresponding to the DetNet flow;

the resource demand indicates a specified scheduling cycle for scheduling and transmitting the DetNet flow of the target egress interface on the head node, and a resource demand number corresponding to the specified scheduling cycle; the specified scheduling cycle is the reference scheduling cycle and the resource demand number corresponding to the specified scheduling cycle is represented by the specified transmission resource S1.

19. The electronic device of claim 17, wherein after, for the target egress interface on each node in the VPFP, planning the target scheduling cycle for scheduling and transmitting the DetNet flow, the operations further comprise: recording a resource allocation result;

wherein the resource allocation result comprises: the VPFP, the target egress interface for transmitting the DetNet flow on the head node, the target scheduling cycle for scheduling and transmitting the DetNet flow of the target egress interface on the head node, and the target transmission resource used for scheduling and transmitting the DetNet flow within the target scheduling cycle; the target transmission resource is S1.

20. The electronic device of claim 15, wherein for the target egress interface on each node in the VPFP, planning the target scheduling cycle for scheduling and transmitting the DetNet flow comprises:

for a reference scheduling cycle for scheduling the DetNet flow of the target egress interface on the head node, executing following cycle determining process:

determining the reference scheduling cycle as a current candidate scheduling cycle of the target egress interface on the head node, and determining whether a currently available transmission resource corresponding to the reference scheduling cycle is greater than or equal to an initial resource demand amount required for scheduling and transmitting the DetNet flow in the reference scheduling cycle; wherein if the reference scheduling cycle is a first scheduling cycle, for which the cycle determining process is performed, of the target egress interface on the head node, the initial resource demand amount is a specified transmission resource S2 specified for scheduling and transmitting the DetNet flow, and otherwise, the initial resource demand amount is determined based on S2 and do; S2 represents a transmission resource required for scheduling and transmitting the DetNet flow, do represents a sum of target transmission resources required for transmitting the DetNet flow in each determined target scheduling cycle of the target egress interface on the head node;

if the currently available transmission resource corresponding to the reference scheduling cycle is greater than or equal to the initial resource demand amount, determining a current basic transmission resource as the initial resource demand amount, and performing block a;

if the currently available transmission resource corresponding to the reference scheduling cycle is not greater than or equal to the initial resource demand amount, determining the current basic transmission resource as a reference resource demand amount which is less than the initial resource demand amount, and performing block a;

wherein the block a comprises: based on the current scheduling cycle and the scheduling cycle mapping relationship between the current node and the next hop node, determining the next scheduling cycle of the next hop node as the current scheduling cycle and the next hop node as the current node; determining whether a currently available transmission resource corresponding to the current scheduling cycle is greater than or equal to the current basic transmission resource; if yes, determining the current scheduling cycle as a candidate scheduling cycle of the target egress interface on the current node; if the current node is not the tail node, returning to the block of determining the next scheduling cycle; if the current node is the tail node, determining the candidate scheduling cycle, determined by this process, of the target egress interface on each node in the VPFP as the target scheduling cycle for scheduling and transmitting the DetNet flow.

* * * * *